(12) United States Patent
Mousseau et al.

(10) Patent No.: US 9,542,222 B2
(45) Date of Patent: Jan. 10, 2017

(54) RESOURCE BROKER SYSTEM FOR DYNAMICALLY DEPLOYING AND MANAGING SOFTWARE SERVICES IN A VIRTUAL ENVIRONMENT BASED ON RESOURCE USAGE AND SERVICE LEVEL AGREEMENT

(75) Inventors: Richard P. Mousseau, Stratham, NH (US); John Herendeen, Upton, MA (US); Helena Aberg Ostlund, Stockholm (SE); Ravi Sankar Akella, Fremont, CA (US); Mark Spotswood, Newton, MA (US); Sutanu Ghosh, Billerica, MA (US)

(73) Assignee: ORACLE INTERNATIONAL CORPORATION, Redwood Shore, CA (US)

( * ) Notice: Subject to any disclaimer, the term of this patent is extended or adjusted under 35 U.S.C. 154(b) by 690 days.

(21) Appl. No.: 12/618,527

(22) Filed: Nov. 13, 2009

(65) Prior Publication Data
US 2010/0125844 A1    May 20, 2010

Related U.S. Application Data

(60) Provisional application No. 61/114,750, filed on Nov. 14, 2008.

(51) Int. Cl.
*G06F 9/455* (2006.01)
*G06F 9/50* (2006.01)

(52) U.S. Cl.
CPC .............. *G06F 9/50* (2013.01); *G06F 9/455* (2013.01); *G06F 9/45504* (2013.01);
(Continued)

(58) Field of Classification Search
None
See application file for complete search history.

(56) References Cited

U.S. PATENT DOCUMENTS 7,024,256 B2 * 4/2006 Krzyzanowski et al. ...... 700/65
7,127,713 B2 * 10/2006 Davis et al. .................. 717/177
(Continued)

FOREIGN PATENT DOCUMENTS

WO    WO 2004081763 A2 *  9/2004    ............. G06Q 40/00
ZW    WO 02097588 A2 * 12/2002    ............... G06F 8/20

OTHER PUBLICATIONS

Klaus et al, A taxonomy and survey of grid resource management systems for distributed computing, 2002, John Wiley & Sons, Ltd., Software Practice and Experience 2002, vol. 32, pp. 135-164.*

(Continued)

*Primary Examiner* — Abu Ghaffari
(74) *Attorney, Agent, or Firm* — Tucker Ellis LLP

(57) ABSTRACT

A system and method can deploy and manage software services in virtualized and non-virtualized environments. The system provides an enterprise application virtualization solution that allows for centralized governance and control over software and Java applications. The system includes a plurality of resource broker agents. Each resource broker agent resides on one of the plurality of virtualized and non-virtualized machines in the computing environment and can be used to manage the software processes and compute resources running in the computing environment. Each resource broker agent is responsible for starting a set of Virtual Machines running on a specific compute resource and performing resource metering control. The system also includes a virtual machine pool that communicates with the plurality of resource broker agents to create and manage the set of virtual machines for each resource broker agent and collect data.

20 Claims, 13 Drawing Sheets

(52) U.S. Cl.
CPC .. *G06F 2209/501* (2013.01); *G06F 2209/503* (2013.01); *G06F 2209/508* (2013.01)

(56) References Cited

U.S. PATENT DOCUMENTS

| | | | | |
|---|---|---|---|---|
| 7,499,968 | B1* | 3/2009 | Alexander et al. | 709/203 |
| 7,500,234 | B2* | 3/2009 | Hatasaki | 717/168 |
| 7,526,234 | B2* | 4/2009 | Miller | 399/167 |
| 7,640,231 | B2* | 12/2009 | Alvarez | G06F 9/5083 |
| 7,703,091 | B1* | 4/2010 | Martin et al. | 717/174 |
| 7,765,552 | B2* | 7/2010 | Miller et al. | 718/104 |
| 8,028,299 | B2* | 9/2011 | Holt | 719/320 |
| 8,108,855 | B2* | 1/2012 | Dias et al. | 717/177 |
| 8,176,486 | B2* | 5/2012 | Amir Husain | 718/1 |
| 8,185,776 | B1* | 5/2012 | Gentes | G06F 11/1438 |
| | | | | 709/223 |
| 8,191,060 | B2* | 5/2012 | Malasky et al. | 717/175 |
| 8,230,434 | B2* | 7/2012 | Armstrong et al. | 718/104 |
| 8,261,277 | B2* | 9/2012 | Prabhakar | G06F 9/5044 |
| | | | | 709/201 |
| 8,490,104 | B2* | 7/2013 | Iino | G06F 9/5016 |
| | | | | 712/216 |
| 8,635,349 | B2* | 1/2014 | Vul et al. | 709/229 |
| 8,892,916 | B2* | 11/2014 | Bieswanger et al. | 713/320 |
| 2006/0274722 | A1* | 12/2006 | Polan et al. | 370/352 |
| 2006/0277307 | A1* | 12/2006 | Bernardin | H04L 67/02 |
| | | | | 709/226 |
| 2007/0180493 | A1* | 8/2007 | Croft | G06F 9/45533 |
| | | | | 726/2 |
| 2007/0233698 | A1* | 10/2007 | Sundar et al. | 707/10 |
| 2007/0250833 | A1* | 10/2007 | Araujo, Jr. | G06F 21/6218 |
| | | | | 718/1 |
| 2008/0022278 | A1* | 1/2008 | Gschwind | G06F 9/4856 |
| | | | | 718/100 |
| 2008/0034365 | A1* | 2/2008 | Dahlstedt | G06F 9/45533 |
| | | | | 718/1 |
| 2008/0059556 | A1* | 3/2008 | Greenspan et al. | 709/201 |
| 2008/0134175 | A1* | 6/2008 | Fitzgerald et al. | 718/1 |
| 2008/0163194 | A1* | 7/2008 | Dias et al. | 717/174 |
| 2008/0215846 | A1* | 9/2008 | Aman | G06F 9/5077 |
| | | | | 711/173 |
| 2008/0244579 | A1* | 10/2008 | Muller | 718/100 |
| 2009/0113426 | A1* | 4/2009 | Mizuno | 718/1 |
| 2009/0158279 | A1* | 6/2009 | Iino | G06F 9/5016 |
| | | | | 718/100 |
| 2009/0199177 | A1* | 8/2009 | Edwards et al. | 718/1 |
| 2009/0248869 | A1* | 10/2009 | Ghostine | 709/225 |
| 2009/0276783 | A1* | 11/2009 | Johnson et al. | 718/104 |
| 2009/0328033 | A1* | 12/2009 | Kohavi et al. | 718/1 |

OTHER PUBLICATIONS

Zak et al, On CompositeWeb Services Provisioning in an Environment of Fixed and Mobile Computing Resources, 2004, Kluwer Academic Publishers, Information Technology and Management 5, pp. 251-270.*

Wang et al, Agent-Supported Web Service Composition for Supply Chain Management, 2006, IEEE, Proceedings of the 8th IEEE International Conference on E-Commerce Technology and the 3rd IEEE International Conference on Enterprise Computing, E-Commerce, and E-Services (CEC/EEE'06), pp. 1-4.*

* cited by examiner

RESOURCE BROKER SYSTEM FOR DYNAMICALLY DEPLOYING AND MANAGING SOFTWARE SERVICES IN A VIRTUAL ENVIRONMENT BASED ON RESOURCE USAGE AND SERVICE LEVEL AGREEMENT

CLAIM TO PRIORITY

This application claims priority to U.S. Provisional Application No. 61/114,750, filed Nov. 14, 2008, entitled "Resource Broker System for Deploying and Managing Software Service in a Virtual Environment," which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates generally to application servers and the providing of application services in an enterprise environment, and, particularly, to a system and method for deploying and managing software services in virtualized and non-virtualized environments.

BACKGROUND

Organizations that utilize enterprise and application server software as part of their enterprise infrastructure are increasingly adopting virtualization technologies as part of their drive to increase utilization and reduce infrastructure costs, while at the same time improving their ability to respond rapidly to a new line of business initiatives.

Hypervisor-based virtualization platforms allow the organization to consolidate their information technology deployments onto a much reduced number of servers running powerful multi-core processors, which, in turn, host multiple virtual machines running applications in their own protected, virtualized environments. As a result, organizations have been able to optimize their physical infrastructure by pooling hardware and storage resources, reduce physical space, ease power and cooling costs, and improve application availability.

Recently, the focus has shifted to application virtualization—technologies that help information technology operations to package, deploy, monitor and control enterprise applications in these new virtual data centers to achieve flexible, dynamic operations that are more responsive, highly available and efficient. This is the area that embodiments of the present invention are designed to address.

SUMMARY

A system and method can deploy and manage software services in virtualized and non-virtualized environments. The system provides an enterprise application virtualization solution that allows for centralized governance and control over software and Java applications. The system includes a plurality of resource broker agents. Each resource broker agent resides on one of the plurality of virtualized and non-virtualized machines in the computing environment and can be used to manage the software processes and compute resources running in the computing environment. Each resource broker agent is responsible for starting a set of Virtual Machines running on a specific compute resource and performing resource metering control. The system also includes a virtual machine pool that communicates with the plurality of resource broker agents to create and manage the set of virtual machines for each resource broker agent and collect data.

DETAILED DESCRIPTION

Figure 1:
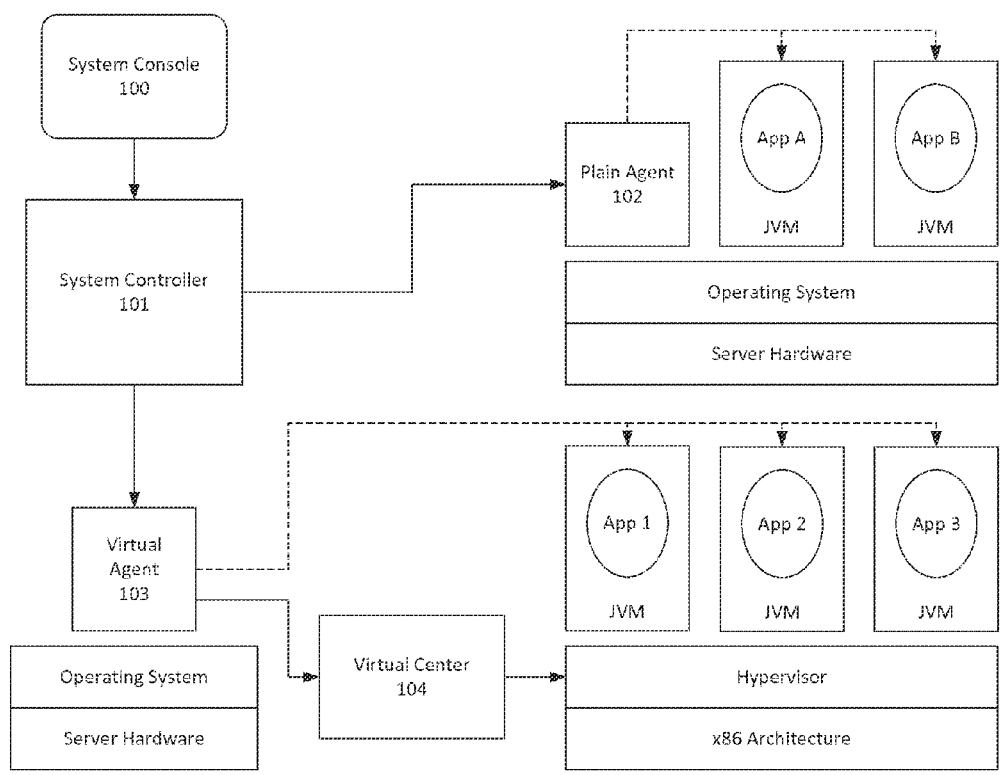
FIG. 1 is an illustration that shows the architecture of a system for deploying and managing software services, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses WebLogic® application server functions or libraries as an example for application server functions or libraries. It will be apparent to those skilled in the art that other types of application server functions or libraries can be used without limitation.

The description of the invention as following also uses Java® Virtual Machine functions or libraries as an example for virtual machine functions or libraries. It will be apparent to those skilled in the art that other types of virtual machine functions or libraries can be used without limitation.

In accordance with an embodiment, the system provides an enterprise application virtualization solution that allows for centralized governance and control over software and Java® applications. Operation teams can define policies, based on application-level service level agreements (SLA) that govern the allocation of hardware and software resources to ensure that quality of service (QoS) goals are met across virtual and non-virtualized platforms. When pre-defined conditions occur, a controller dynamically apportions resources to applications or services by invoking the deployment capabilities of the underlying infrastructure. This allows organizations to take advantage of the computing power available from modern processing systems and hypervisor-based virtualization technology. Applications can be deployed on a pool of virtual resources and dynamically extended or re-configured to meet runtime requirements, without constant monitoring by system operators.

In accordance with an embodiment, application administrators can set policies that govern such features as how many servers must be available in a given domain, the maximum load that those servers should support, the response time required for individual services, and other important Service Level Agreement (SLA) metrics. If any of these parameters are breached, the system can respond immediately by provisioning further server instances, migrating existing instances to more suitable resources, or taking other actions to reconfigure the application's runtime environment.

In accordance with an embodiment, the system automatically maps application activity to the most appropriate resources of the underlying platform, so that in a virtualized environment the system can invoke hypervisor-based services to clone, deploy or to migrate servers; while in a non-virtualized operating system (OS)-based environment, the system can start additional resources wherever they have been defined. The system can also provide application-level monitoring and automation for all Java® applications, whether those applications are running virtualized or on a dedicated server. In a typical organization, the information operations can contain a mixture of virtual and dedicated servers (since not all applications can be effectively virtualized and in some cases a mixed architecture may be appropriate). Using the system herein, an organization is able to control and optimize Java® applications both at the Java® Virtual Machine (JVM) and application server layers, regardless of how and where those applications are running.

In accordance with an embodiment, the system comprises two principal components: a Controller, and one or more Agents. The Controller maintains a secure repository of service deployments and SLA policies that are monitored by the system, with a high-performance customizable rules engine that allows the system administrator to specify what actions should be taken when those service levels are at risk. The Controller monitors JVM, application and other metrics, and is able to perform configuration changes and provide process control, so that operations teams can automate key tasks aimed at maintaining application quality of service (QoS), such as provisioning new server instances or migrating existing deployments to alternative hardware resources, based on the runtime behavior of applications and the SOA services that underpin them. The Controller can determine optimal resource placement for service deployments and JVM creations by matching service deployment requirements with specific resource pool capabilities. Action pipelines can be defined to allow complex, sequenced activities to be initiated in response to an event or condition and calendar-based rules allow scheduling of actions to be performed on a one-off or periodic basis.

Agents manage the virtualized or non-virtualized resources that make up the application domain to be managed. These can be virtual appliances (for example, WLS-VE) running on hypervisor-based virtualization platforms, dedicated app server, or JVM-based deployments. Agents determine the resource capabilities of the managed resource environment, and provide appropriate process control operations and platform-specific runtime information. Agents collect and aggregate a rich variety of information about the resources and services they monitor, which they return to the Controller.

The Controller and Agents can run within virtual machines, or on dedicated servers. For example, in some embodiments the Controller can run on its own, dedicated server, as can the Virtualized Agent which manages the server instances running in virtual machines on the hypervisor. Virtualized server resources, process control and virtual machine monitoring can be performed via API calls. Both virtualized and non-virtualized resources can be controlled in a single domain. In accordance with a particular embodiment, the system and features thereof are referred to as a Liquid Operations Control (LOC) system. These and other features and benefits are described in further detail below.

Glossary

The following terms are used throughout this document:

Controller—A centralized component or process that gathers data about the operating environment from Agents. The Controller uses the data gathered to enforce policies and to deploy new services in a way that best honors the SLA of all deployed services. The Controller hosts the Administration Console.

Agent—A component or process that provides information about the environment to the Controller, starts and stops processes, and invokes other actions at the request of the Controller. In accordance with an embodiment, the system can use two types of Agents: a Plain Agent for managing any type of Java process, that renders the resources from the machine on which it resides as a resource pool; and a Virtualized Agent for managing instances of Application Server running in a virtualized environment, that renders the virtualized resource pools as system-accessible resource pools, and can reside on any machine in the operations center that has access to the virtualized environment.

Administration Console—A graphical user interface that an administrator can use to configure, manage, and monitor services in the operations center.

Managed Java Process—A process instance initiated by the system and then monitored.

Action—A software class that can display alert messages in the Administration Console, send notifications, or change the runtime state of a service. Actions can be adjudicated, requiring user input before the system invokes the action pipeline. Actions can be invoked by the Controller as part of enforcing a policy, or manually from the Administration Console.

CPU cycles/Computer Power—A measurement of the CPU resources that a resource pool can supply and that a service needs. The measurement can be normalized across CPU architectures so that a megahertz of processing on an i386 processor is comparable to a megahertz on other types of processors.

Hypervisor—Virtualization software that allows multiple operating systems to run on a single physical computer at the same time.

JMS—Java Message Service.

JMX—Java Management Extensions.

JVM—Java Virtual Machine.

Managed Environment/LOC environment—The collection of all resource pools, services, processes, Agents and Controller in a single installation at an organization.

Machine/Server—Either a physical machine or a virtual machine.

Metric—A numeric runtime value that describes the performance of a process or process group and the resource environment. Some metrics are aggregations or calculations of raw (observed) data. Policies set constraints on metrics.

Physical Host—The physical machine that is hosting a Controller, an Agent or any of the processes that the system is managing, including virtual machines that the system has started.

Policies—Runtime requirements for a service and actions to take when the service operates outside the requirements. In accordance with an embodiment, each policy comprises two parts: a single constraint and an action or pipeline of actions. Multiple policies can be created for each service. Policies can apply to the resource environment, all processes in a service, to a group of processes (process type), or to a single process.

Process/Application—A program that the system manages. For example, a single application server managed server can be considered a process. From the perspective of the system, a Java process consists of an entire JVM stack and includes any application server and applications being managed.

Process Group/Process Type—A collection of processes in a service for which policies can be written. For example, a process group can contain three application server instances, and a policy can be written that starts all three server instances when the service is deployed.

Resource Pool/Computer Resource—A virtual environment, or a physical environment, in which services can be deployed. Each resource pool provides access to physical computing resources (such as CPU cycles, memory, and disk space) and pre-installed software that a service needs to run. A resource pool also contains a description of the failover capabilities of the machines that host the computing and software resources.

Service/Application—A collection of one or more processes that the system manages as a unit. Each process in a service is a software stack starting from the Java Virtual Machine (JVM) and including the classes that are running in the JVM. For example, in some embodiments a service can be created for managing a single application server instance on which is deployed a single Java EE application. Alternatively, a service can be created for managing all server instances in a cluster. In accordance with an embodiment, a service specifies requirements for the physical computing resources that are needed to run all of its processes, expressed as a range of CPU cycles, memory, and disk space, an optional set of policies that define an SLA, and actions to take when the service is operating outside of the SLA. Metadata can also be provided that defines the Java classes or other executables that comprise the service processes.

System Environment

In accordance with an embodiment, a system is provided which includes a management framework for virtualized and non-virtualized enterprise Java applications. A layer of abstraction is provided over complex operation environments that enable operation staff to think in terms of supply and demand. The framework also offers a policy-based framework for creating and automatically enforcing service level agreements for Java applications, and allows the system to monitor resources across the operations center and distribute the deployment of Java applications in a manner that ensures the overall efficient use of resources.

On the demand side, the system can be used to organize Java applications (processes) into services. Typically, a group of related processes are organized into a single service and the group is then managed as a unit. Alternatively, one service can be created for each process. On the supply side, the system can be used to organize the computer resources in an operations center into collections of resources, or resource pools. A resource pool can represent a single physical machine or a collection of virtualized resources that are made available through Hypervisor software. In accordance with an embodiment, the system provides an environment for encapsulating an SLA as a collection of requirements and policies. The operation team can define policies based on application-level SLA that govern the allocation of hardware and software resources, ensuring that quality of service (QoS) goals are met across virtual and non-virtualized platforms.

FIG. 1 is an illustration that shows the architecture of a system for deploying and managing software services, in accordance with an embodiment. As shown in FIG. 1, a typical deployment contains a single Controller 101, and multiple Agents 102 and 103 that manage and monitor resources and communicate that information back to the Controller 101. The Controller 101 gathers data about the operating environment from the Agents 102 and 103. The Controller 101 then uses the data gathered to intelligently deploy new services and to evaluate and enforce policies to honor the SLA for all services in the environment. The Controller 101 also hosts the Administration Console 100 that enables an administrator to visually configure, manage, and monitor the environment.

When predefined conditions occur, the system dynamically allocates resources to services. The system then monitors the use of resources across the operations center and distributes the deployment of Java applications in a manner that ensures the most efficient use of resources overall. When a service is deployed, or when a system action requests that an additional process be started, the system examines all resource pools to determine where to host the service or process. To choose a resource pool, the system first eliminates any resource pool that cannot satisfy particular dependencies (such as IP addresses or access to software. For example, if a service requires access to Application Server software, then the system eliminates any resource pools that cannot provide access to Application Server software). After considering declared dependencies, the system then considers the capacity of each remaining resource pool, the SLA of any services that are currently deployed, and the relative priorities declared for each service. It then uses an appropriate algorithm to determine which resource pool to use.

One example is based on most resources available. In this approach the system chooses the resource pool that currently has the most excess capacity. For example, if resource pool A has 600 MHz of CPU and 600 MB of RAM that are currently unused, and resource pool B has 400 MHz of CPU and 400 MB of RAM that are unused, then the system chooses resource pool A.

Another example is based on most efficient use of resources. In this approach, the system chooses the resource pool that has just enough unused resources to satisfy the minimum resource requirements of a deployment request. This algorithm ensures the system is best positioned to handle services whose resource requirements are larger than the current request. For example, if resource pool A has 600 MHz of CPU and 600 MB of RAM that are currently unused, and resource pool B has 400 MHz of CPU and 400 MB of RAM that are unused, and if a service is deployed with a minimal requirement of 200 MHz of CPU and 200 MB of RAM, then the system chooses resource pool B.

System Controller

Figure 2:
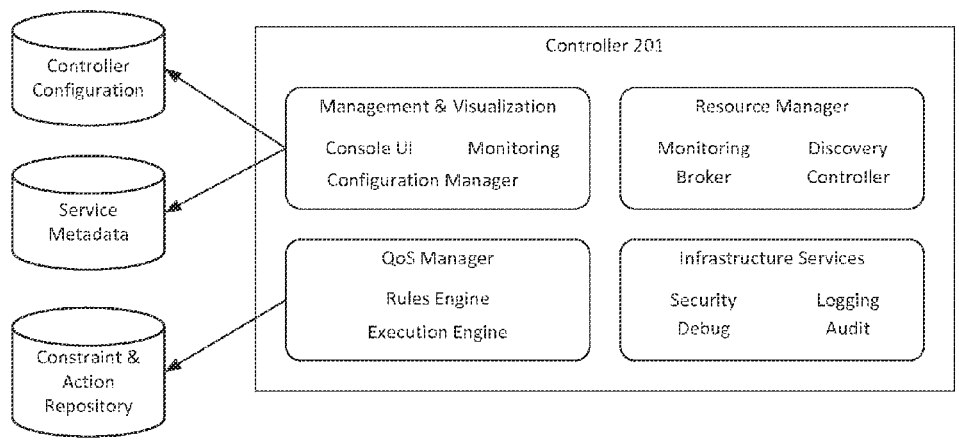
FIG. 2 is an illustration that shows the architecture of a Controller for use with the system, in accordance with an embodiment.

FIG. 2 is an illustration that shows the architecture of a Controller 201 for use with the system, in accordance with an embodiment. Each instance of the system environment includes a single Controller 201. The Controller 201 is responsible for hosting the Administration Console that enables the administrator to visually configure, manage, and monitor the environment; managing resource pools; managing the creation of services; managing the creation of SLA agreements; and, providing logging and audit trails.

To manage resource pools, the Controller communicates with Agents to determine the computing resources that each Agent is capable of allocating and selects appropriate resource pools for deploying services. To adapt the system environment to best meet the SLA of all deployed services, the Controller communicates with Agents to gather metrics. It also compares policy constraints against the metrics and invokes actions when services operate outside the constraints. The Controller configuration, service metadata, and SLA information are stored as XML files and stored locally on the machine that is hosting the Controller.

System Agents

Figure 3:
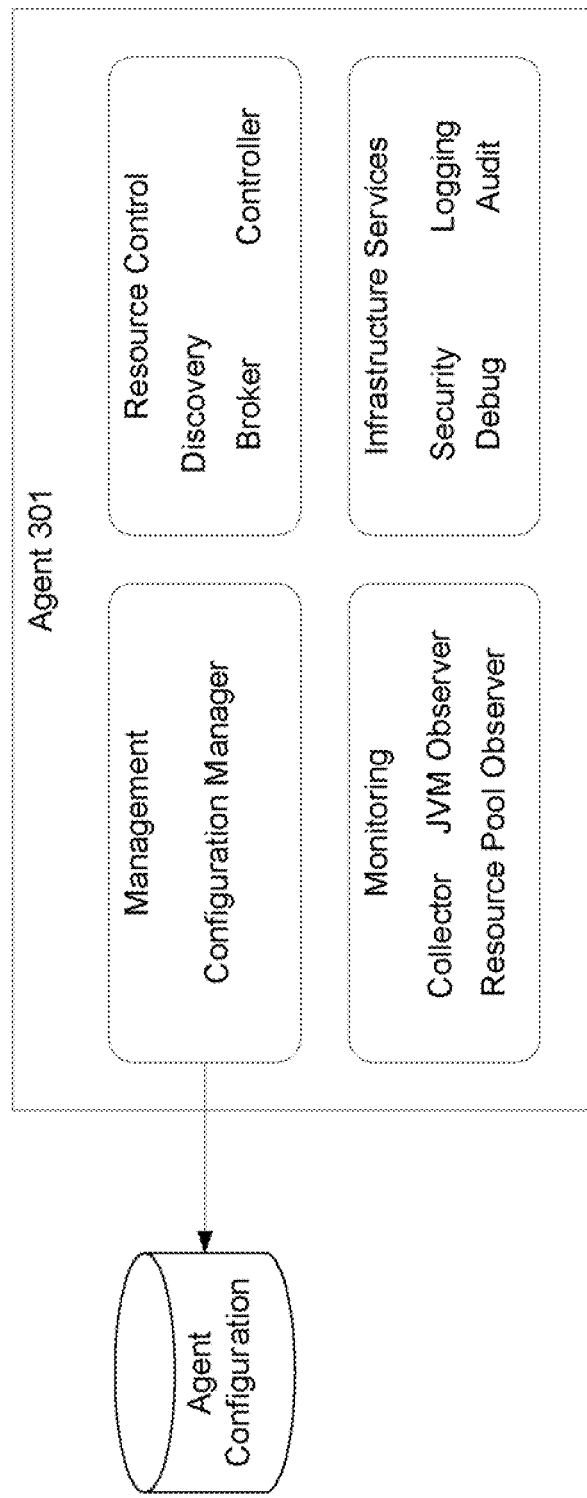
FIG. 3 is an illustration that shows the architecture of an Agent for use with the system, in accordance with an embodiment.

FIG. 3 is an illustration that shows the architecture of an Agent 301 for use with the system. In accordance with an embodiment, an Agent 301 is a standalone Java process that renders the CPU cycles and memory of a machine or a collection of virtual resources as resource pools for use by services. As described above, in accordance with an embodiment, the system supports two types of Agents: a Plain Agent for managing any type of Java process, and that renders the resources from the machine on which it resides as a resource pool; and, a Virtualized Agent for managing instances of Application Server running in a virtualized environment, and that renders virtualized resource pools as system resource pools. Agents can use XML documents to save information about the resources that the Agent exposes for use by the system. Agents can also use unique identifiers for each of the managed processes being managed by that Agent.

In accordance with an embodiment, a Virtualized Agent can communicate with the Virtual Center or similar process, to gather data about the resource pools that are available for use by the system and to manage instances of Application Server. After an Application Server instance starts, the Agent communicates with the Application Server instance to gather monitoring data and invoke management actions.

In accordance with an embodiment, each instance of the system environment includes one or more Agents 301. The one or more Agents 301 is responsible for managing and storing its configuration information; providing ongoing visibility into the amount of resources that the system is using for a given resource pool; controlling the life cycle of JVMs in a resource pool upon request from the Controller; gathering metrics and monitoring data of its instantiated JVMs and making this data available to the Controller; and, providing logging and audit trails.

Administration Console

Figure 4:
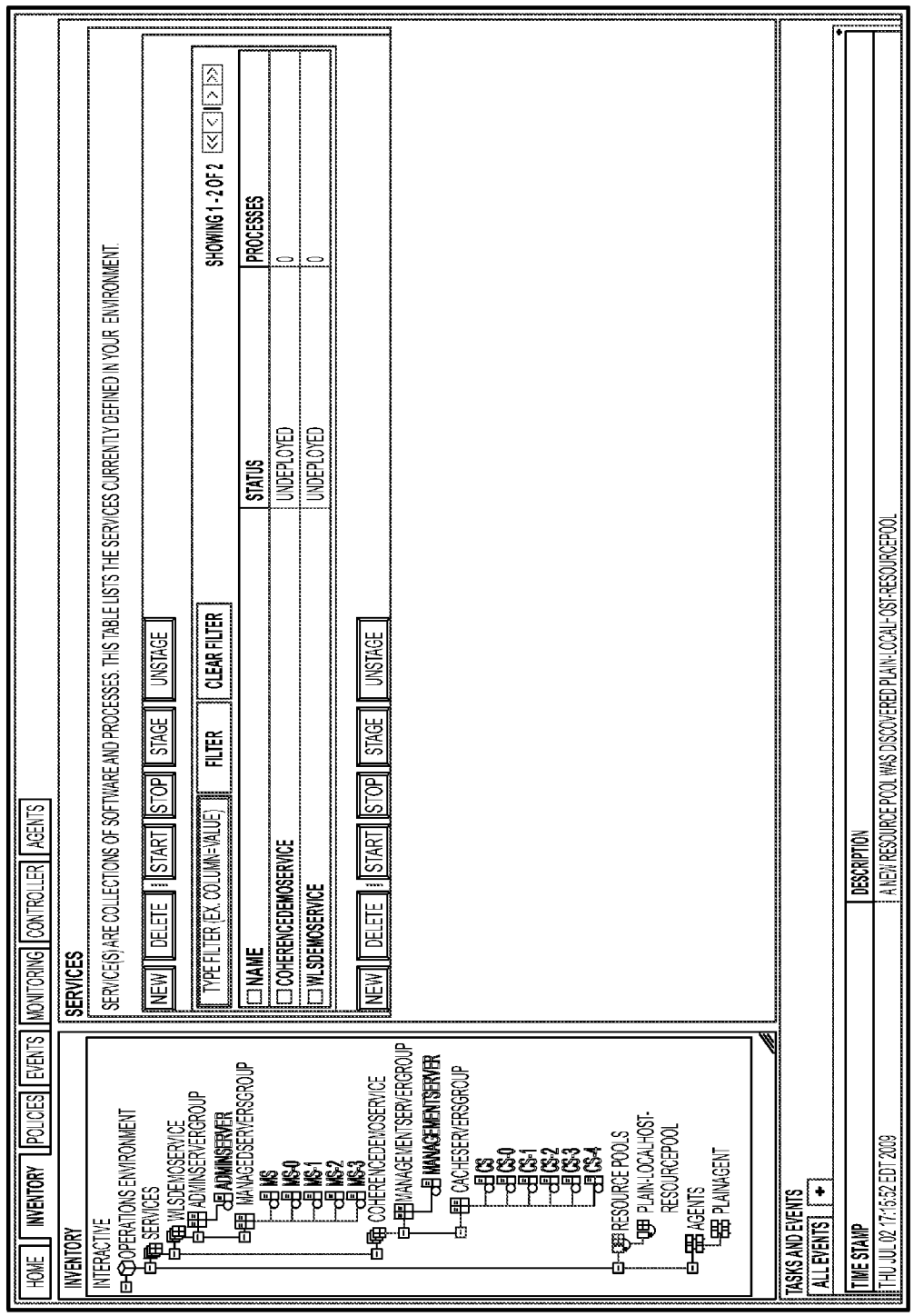
FIG. 4 is an illustration that shows a screenshot of an Administrative Console or interface, in accordance with an embodiment.

FIG. 4 is an illustration that shows a screenshot of an Administrative Console or interface. In accordance with an embodiment the Administration Console is a browser-based, graphical user interface that the administrator can use to configure, manage, and monitor services in the operations center. The interface can be hosted by the Controller, which communicates with Agents to gather monitoring data and to invoke management actions.

In one embodiment, the Administration Console can configure network communications for Controllers and Agents; organize computing resources into resource pools; organize Java applications into services; create policies to enforce SLA for services automatically; configure logging and auditing features; create users and assign them to groups and roles; deploy and activate services; invoke actions to manually affect services; monitor the performance of services; monitor the use of computing resources on machines that host resource pools; and, view Controller log files and security auditing files.

Administration Console and Configuration of Services

Figure 5:
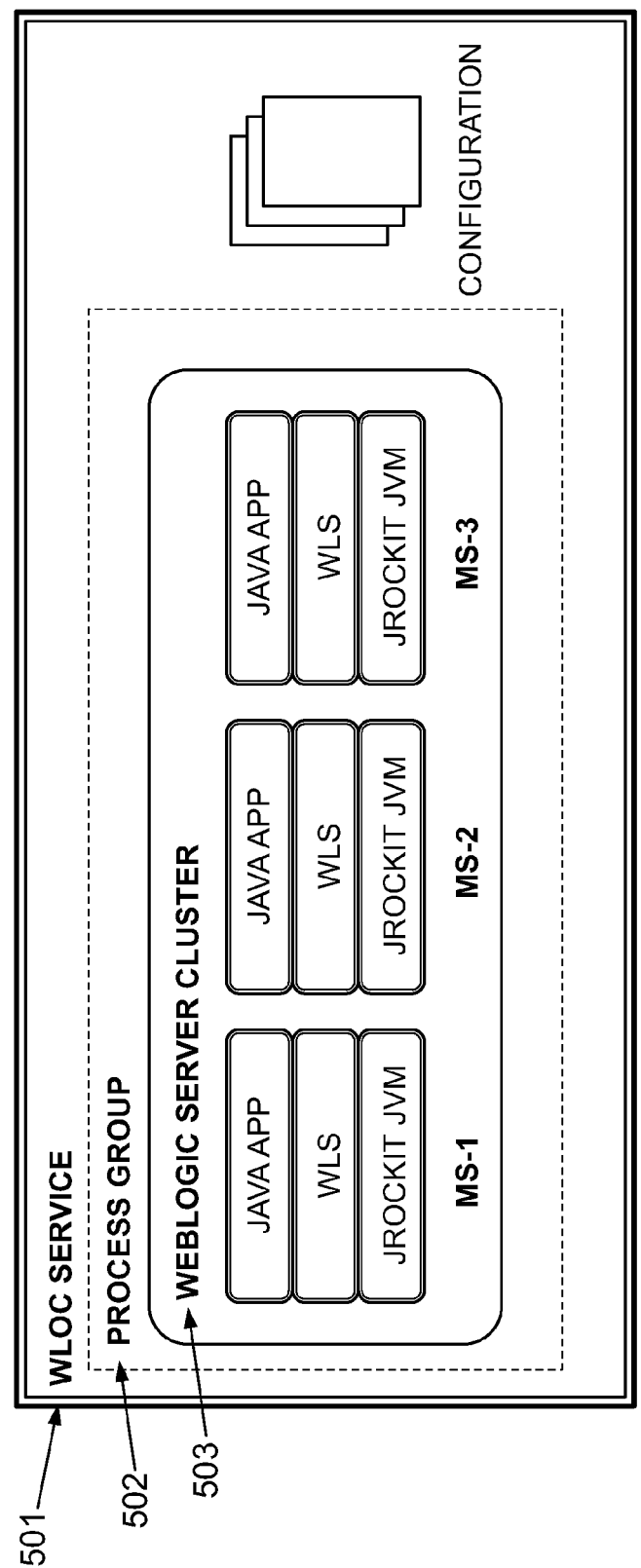
FIG. 5 is an illustration that shows the architecture of a system for deploying and managing software services as process groups and clusters, in accordance with an embodiment.

FIG. 5 is an illustration that shows the architecture of a system for deploying and managing software services as process groups and clusters, in accordance with an embodiment. A service is a collection of one or more processes that the system manages as a unit. Each process in a service is a software stack starting from the Java Virtual Machine (JVM), including the classes that are running in the JVM. Typically, processes that perform the same function are organized into process groups. (For example, all of the servers in a cluster can be organized within a process group). The administrator can specify attributes for each process group such as:

- The number of instances of the process groups to create initially and the minimum and maximum number of process instances allowed for the service;
- The minimum amount of resources that the process requires and an upper limit of resources that the process can use. The system reserves the minimal resources for exclusive use by the process and grants additional resources if they are available;
- A priority for the service, which the system uses to resolve conflicts when more than one service fails to meet its SLA at the same time;
- Any information required by the system in order to deploy processes, including the main class, JVM startup arguments, and software dependencies;
- A ready metric, which the system uses to determine when a process has been successfully started and can be monitored; and
- Any software dependencies including the name and location of the software that the processes require to run.

The administrator can also define one or more policies that specify the deployment or runtime requirements (constraints) for the service and the actions to take if the SLA constraint is not met. For example, a policy can be used to expand or shrink a service's footprint in response to the runtime environment. Constraints can be placed on a process, a group of processes, or all processes in a service. In accordance with an embodiment, constraints can be based on a calendar value, or, if the managed processes expose management data through Java Management Extensions (JMX), then by constraining the value of an MBean attribute in the processes.

For example, in FIG. 5, an administrator can create a service 501 that specifies a process group 502 for a collection of externally-facing web services, all of which run on a single application server cluster 503, and can configure the process group 502 as follows:

Resource Minimum=Reserve 400 CPU cycles, 600 MB RAM.

Resource Maximum=Allow services to use up to 800 CPU cycles, 800 MB RAM.

Resource Priority=Specify highest priority over all other services.

Initial Deployment State=Start Administration Server and two Managed Servers.

For example, a policy can be created that starts an additional cluster member during business hours. A second policy can be created that starts two additional members if servlet response time drops below 2 seconds, and that stops the additional members if response time is faster than 0.1 second. When the service is deployed, the system reserves the prescribed 400 CPU cycles and 600 MB of RAM for exclusive use by the service. As the system adds processes to the service, it requests additional resources for use by the service up to the maximum. If the additional resources are currently being used by other processes, the system can remove resources from lower-priority processes, as long as each process retains its minimal reserve.

Administration Console and Monitoring of Services and System Resources

Figure 6:
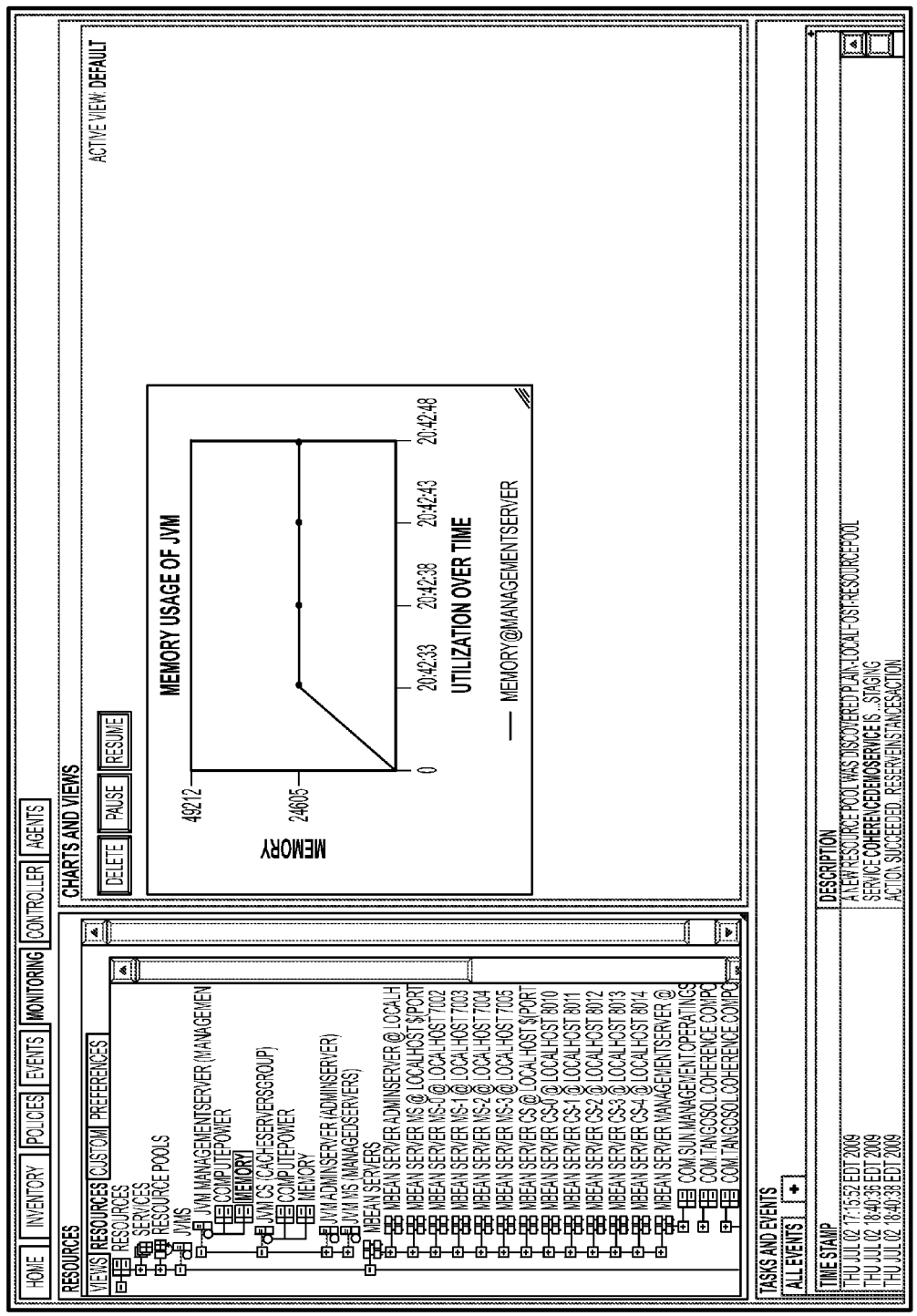
FIG. 6 is an illustration that shows another screenshot of an Administrative Console interface that displays metrics, in accordance with an embodiment.

FIG. 6 is an illustration that shows another screenshot of an Administrative Console interface that displays metrics, in accordance with an embodiment. The performance of system resources can be charted using charts and graphs that describe the amount of resources the service is using from a resource pool relative to the amount of resources available, and the runtime statistics from each JVM within the service.

In accordance with an embodiment, services and system resources can be monitored based on:

Information about events and action that have occurred in the environment and the time that they occurred;

Actions that are currently pending and that require approval;

Notifications that are triggered when a service operates outside of a policy constraint. The administrator can configure the system to generate notifications using Java Message Service (JMS), Java Management Extensions (JMX), Simple Mail Transfer Protocol (SMTP), and Simple Network Management Protocol (SNMP);

Log messages about events such as the deployment of services or the failure of one or more actions; and Audit messages that capture changes to the Controller, Agents, or service configuration.

Administration Console and Security

Figure 7:
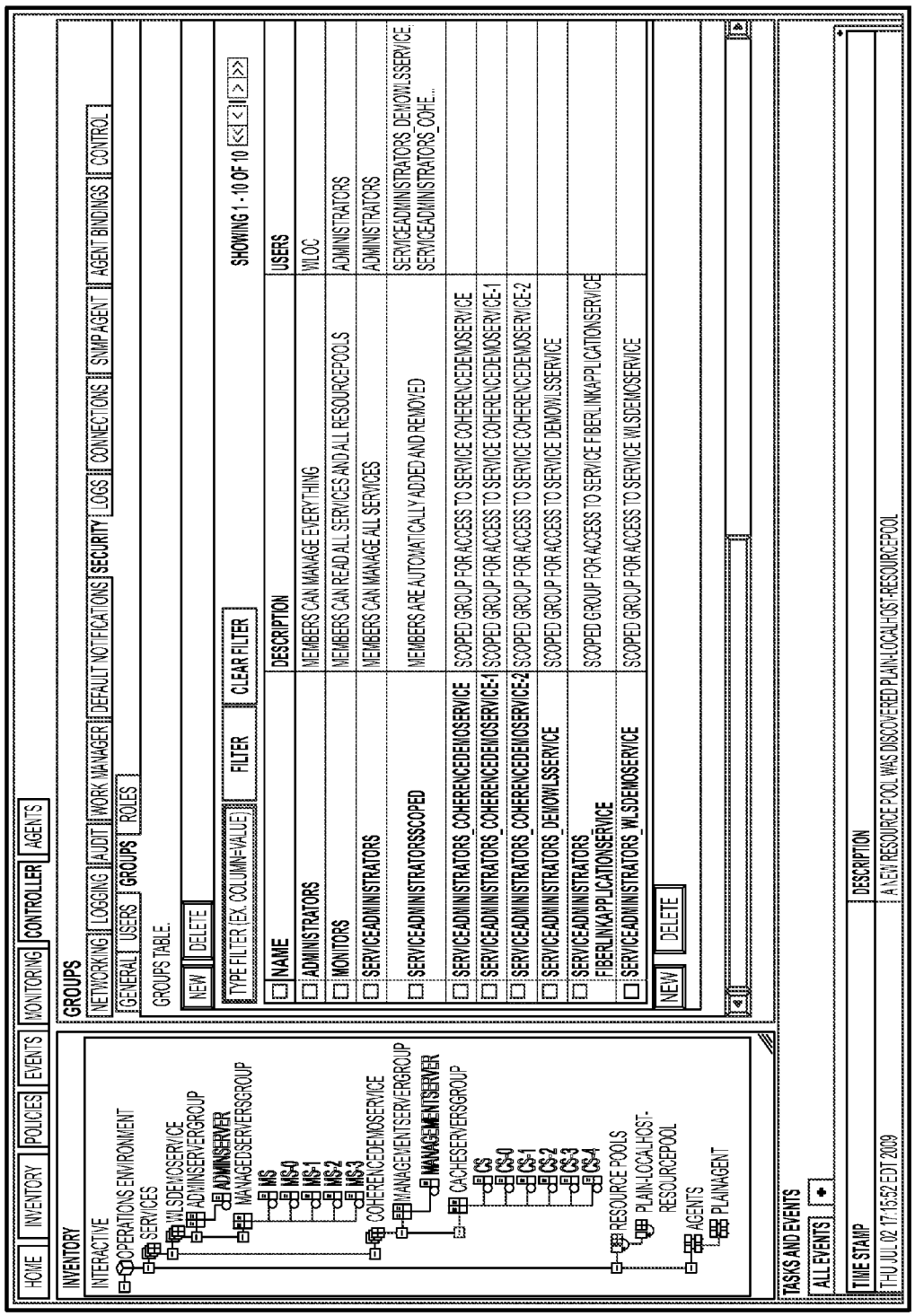
FIG. 7 is an illustration that shows another screenshot of an Administrative Console interface that allows for setting of filters, in accordance with an embodiment.

FIG. 7 is an illustration that shows another screenshot of an Administrative Console interface that allows for setting of filters. In accordance with an embodiment, the system uses role-based access control to enable an administrator to assign different levels of privileges to different users or groups. The system also includes a set of security roles with pre-configured access privileges, and groups that can be configured to be in one or more of the defined security roles. An administrator can then create users and assign them to groups, or directly to security roles.

Resource Broker Agent (RBA)

A Resource Broker Agent (RBA) resides inside the System Agent and manages the JVMs on a single compute resource. The compute resource is where the RBA starts JVMs, i.e., a physical machine or a resource pool. Depending on the type of the System Agent, the compute resource can be a normal machine or a resource pool on a hypervisor that can host special Virtual Machines (VMs), such as a VM that supports virtualization and does not require a supporting host operation system (OS).

The Resource Broker Agent (RBA) is the component of the System Agent that is responsible for managing one or more sets of Compute Resources in the managed environment. When the System Agent is initialized, the RBA instantiates the Compute Resource based upon the configured physical or virtual resources at its disposal. The System Agent then provides this information to the System Controller's Resource Broker. This information is included in the overall set of resources managed by the JVM Pool.

The Resource Broker Agent (RBA) handles any request from the System Controller Resource Broker to conduct JVM level operations utilizing the given set of Compute Resources. This includes the creation and management of new JVMs allocated by the Resource Broker Agent (RBA) against these resources.

The Resource Broker Agent (RBA) can provide a list of the available managed Compute Resource or a list of the consumed managed Compute Resource. In addition, The Resource Broker Agent (RBA) can create and start a JVM. Once a JVM has been created or started, the Resource Broker Agent (RBA) can further shutdown the JVM, destroy the JVM, suspend the JVM, resume the JVM, store an image of the JVM, and change resource requirements (after create, before start) of the JVM. The exact set of JVM level capabilities supported is dependent upon the physical or virtual environment that the Resource Broker Agent is utilizing. These capabilities and the differences in how they are supported are described in detail below. In addition to the control operations supported, the Resource Broker Agent (RBA) is also responsible for providing resource consumption and metric information relative to the JVM's that it has allocated and the Compute Resource it is representing.

The Resource Broker Agent (RBA) provides different capabilities depending upon the environment that is being supported. The base RBA supports the same contract regardless of whether or not it is managing a physical environment or a virtual environment. However, there can be a unique implementation layer for the physical environment and for each virtual technology that is supported.

The Plain Agent is instantiated in the environment where JVMs are to be created in a normal operating system. The Plain Agent is roughly equivalent to the Node Manager but adheres to the Resource Broker Agent contract. The implementation is able to run on any OS that supports a java-executable.

The Virtualized Agent is instantiated in the environment where JVMs are to be created for execution in a virtualized environment. The Virtual Agent is configured to communicate with the Virtual Center Infrastructure. This enables resource discovery of the given virtualized resource pools as well as the ability to perform the necessary control operations for the creation, monitoring and management of JVMs.

In one embodiment, the Resource Broker Agent (RBA) can surface to the System Controller the resources available for allocation and management from the given System Agent environment.

The Resource Broker Agent (RBA) can surface a subset of the resource topology that is to be used by the Controller's Resource Broker. This information includes CPU capacity (PowerUnits or MHz), number of CPUs, Memory availability, Disk, Mount points, Software, and Licenses in connection with a given Compute Resource. The manner in which these resources are determined varies based upon the Agent type that is instantiated.

A Plain Agent surfaces a single Compute Resource that represents the physical resources available on that one physical machine. While some of the information specified above could be calculated at startup, it is likely that this information is configured either at installation time or manually at a later time; either via Wizard or file modification. On the other hand, each Virtualized Agent surfaces a Compute Resource that allows for the management of one virtual Resource Pool. The architecture allows for a single System Agent to support one or more Compute Resources in the same System Agent process. In the case of the Virtualized Agent, much of the resource topology information can be derived directly from what is already configured for the Resource Pool. It is necessary, however, to support configuration that augments this information for a given Compute Resource to allow specification of information like mount points, software and licenses.

Where possible, the Resource Broker Agent (RBA) implementations can detect modifications to the configured environment. One example is a modification of the ESX Resource Pool configuration that is defined and managed via the Virtual Center infrastructure. Such information can be used internally by the System Agent as well as made available to the Resource Broker in the System Controller.

The Resource Broker Agent (RBA) uses the Observer contract for surfacing the resource consumption information for both the Compute Resource and the allocated JVMs. The RBA then is responsible for any request from the System Controller Resource Broker to conduct JVM level operations utilizing the given set of Compute Resources. This includes keeping the System Controller aware of the resources available from the given Compute Resource as well as surfacing the operations for the creation and management of new JVMs allocated by the RBA against these resources.

For a Plain Agent, the Resource Broker Agent (RBA) supports shutdown and destroy a given JVM. In addition, for a Virtualized Agent, the RBA supports shutdown, destroy, suspend, resume, migrate, store image and change resource requirements (after create, before start) for a given JVM.

Figure 8:
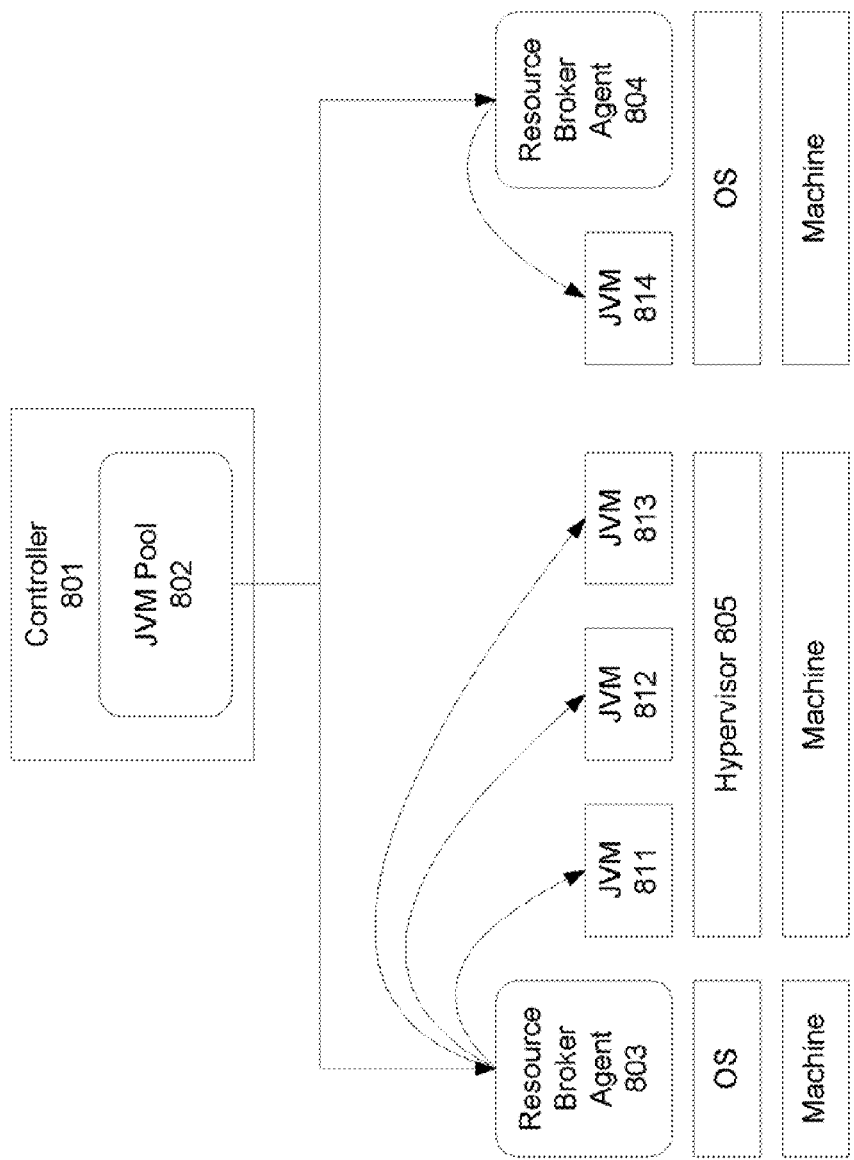
FIG. 8 is an illustration that shows a schematic example of a Resource Management in a virtual environment.

While the Resource Broker Agent (RBA) is in place to handle JVM level control operations, it is not the sole mechanism for delivering all actions, especially those intended for container and service level control. The System Agent can dynamically register handlers that provide container or server specific control actions. This mechanism can be extended to allow for the definition of new Actions in the System Environment that can be configured for the System Controller and executed in the System Agents. In addition, persistence is also needed to save the information for all JVMs that are currently being managed for a given RBA.
Resource Management in a Virtualized Environment FIG. 8 shows a schematic example of Resource Management in a virtualized environment. As shown in FIG. 8, Resource Broker Agents (RBAs) 803 and 804 are used to manage JVMs in a virtualized environment. In this example, RBA 804 manages a JVM 814 running on a machine with an ordinary operating system. Another RBA 803 manages three JVMs 811, 812 and 813 running on a hypervisor 805 without any traditional Operation System (OS). In one example, RBA 803 can run on a separate machine with a traditional OS. In another example, RBA 803 can run in its own virtual machine with an operating system on top of a hypervisor.

As shown in FIG. 8, the Resource Broker of the System Controller architecture includes a JVM Pool 802. The JVM Pool 802 is responsible for interaction with the System Agent(s) to enable the System Controller 801 to discover, monitor and interact with the full set of resources available in the System management domain as well as monitor and manage the services it has deployed against these resources.

The JVM Pool 802 creates an interface for higher layers to access Java processing power in a machine independent way. The JVM Pool 802 is responsible for handing out new JVMs to the above layers in System Controller 801; making sure the right set of files is available on the physical machine or remote storage when the JVMs start; and, monitoring the current resource usage of the running JVMs; and, where possible, using resource control functionality of the underlying machine to provide resource isolation for multiple JVMs running on the same box.

In one embodiment, both sides of the Resource Management architecture (the JVM Pool and any System Agent) implement a same set of standard interfaces. The same interfaces on both sides allows for remote procedure calls using web services.

The interfaces include a JVMBroker interface, a JVM interface, and a JVMGroup interface. The JVMBroker interface is responsible for the creation of new JVMs. The JVM interface is used to start, suspend, resume and stop a real JVM as well as change the resource contract for a JVM. A JVM Group manages a set of JVMs that form a group. The JVMGroup interface is intended to be an abstraction for a number of JVMs. One can specify which IP-addresses are available for a JVM Group and provide fault tolerance by specifying the minimum number of machines that the group should run on.

In addition, the ResourceBroker interface is an extension of a JVMBroker interface and gives access to the agents and compute resources in the global JVM Pool. The ResourceBrokerAgent interface is intended to be the representation of the RBAs to an external system using the Resource Broker. These two interfaces provide a way to inspect the JVM Pool and its agents.

The system also comprises a JVMRequest class for specifying requirements on a JVM before it is created, both in terms of a resource agreement which indicates how much resources the JVM may use, and other more global requirements such as where it may be located in relation to other JVMs and any extended capabilities that are required.

Also, there are two listener interfaces: the JVMBrokerListener interface and the JVMListener interface. When JVM lifecycle events are at concern, these two interfaces can be implemented so that the corresponding registerListener events on the JVMBroker and JVM can be called. The JVMBrokerListener interface is used to subscribe to JVM creation events. The JVMListener interface is used to manage other events such as: JVM Exited, JVM aboutToStart, JVM aboutToSuspend and JVM resumed.

The Resource Management architecture provides a uniform way of creating and controlling JVMs independent of the operating environment. The Resource Management architecture also provides the ability to measure resource utilization correctly and efficiently. In addition, the Resource Management architecture provides efficient resource control such as an unique standardized ability to control the amount of resources of different types that are used (CPU/Memory/I/O). In addition, the Resource Management architecture enables live migration that provides the ability to move running instances from one box to another without down-time. In addition, the Resource Management architecture enables more efficient utilization of servers.

Furthermore, the Resource Management architecture provides an abstraction layer on top of virtual or physical hardware to ease the management of the system. More specifically, the Resource Management architecture provides the ability to create a new JVM somewhere in the virtual environment; resource metering; resource guarantees (min/max CPU/Memory/Network bandwidth); the ability to dynamically increase/decrease resources; the ability to suspend to disk/resume from disk a running application; the ability to move a running instance to another box without stopping the running instance; and, the ability to keep track of the compute resources that are available for Java execution.

Resource Discovery

The System Controller is responsible for adapting and managing the managed environment to best satisfy the resource requirements expressed in the deployed services with the resource availability of the System environment. The System Controller comes to know the full set of resource availability by aggregating the set of resources available from each of the System Agents that it is communicating with. Each of the System Agents can be associated with one or more RBAs that manage JVMs. In order to perform this aggregation, the System Controller can first establish communication with each of the System Agent(s) in a virtual environment.

Agent Discovery provides the System Controller the ability to access the necessary information regarding the available resources in the environment. In order for the System Controller to determine and track the full set of resources at its disposal, it first establishes communication with the System Agent(s).

The System Controller can support two models of initial System Agent interaction, one being explicitly configured discovery and the other being dynamic discovery.

For explicitly configured discovery, the System Controller requires that the IP address and port be specified for each System Agent that it interact with. This allows for the System Controller, at startup, to attempt to establish communication with each configured System Agent and, if successful, discover the set of resources available via that System Agent. It is also possible, at any time, to dynamically configure a new System Agent into the virtual environment. It is also possible to remove a System Agent from the virtual environment.

The system can maintain a state for each configured System Agent. The states can include configured, enabled, active, inactive and disabled. This allows for a configured System Agent to be present in the configuration, but not be actively surfacing its resources as part of the greater resource pool. It also allows for a System Agent to be actively providing resources to existing deployed services but not be available for new service deployment. In one embodiment, it is also forbidden to remove a System Agent that is providing resources.

In addition to the explicitly configured System Agent approach described above, the Controller can dynamically discover new System Agents as they are instantiated in the managed environment. This requires a solution where each System Agent initiates a handshake operation over multicast to attempt to establish communication with the System Controller. The System Controller can accept this initial handshake operation and can initiate the equivalent exchange as is described above in the configuration-based approach. The result is that the System Controller configuration is updated to account for this new System Agent.

Given the importance of the interaction between the System Controller and System Agents it is important to provide for a robust solution for the communication channel established between the two processes. As part of this, the Controller can internally provide reconnect ability for each System Agent that it is communicating with. This ability is transparent to the System Administrator in that an interaction is not required, but any reconnect attempts, both successful and failed can result in a log record. The System Controller provides a configurable attribute to define either the number of reconnect attempts or duration of reconnect attempts before a System Agent is considered inactive.

In one embodiment, the System Controller and System Agent can have sporadic communication. In addition, a timed communication mechanism can facilitate early detection of a communication problem. Again, the interval of this interaction is configurable at the System Controller.

Resource Broker and Resource Control

The Resource Broker component of the System Controller, such as the JVM Pool, is responsible for maintaining the knowledge of which System Agents are present and, more importantly, the pool of resources available from each of these System Agents.

JVM Pool is utilized to broker allocation requests based upon the constraints and requirements expressed for a given Service that is to be deployed. This brokering can result in communication that is initiated to the appropriate Resource Broker Agent (RBA) that resides in a System Agent.

As a part of Agent Discovery or Topology Discovery, there is a bootstrap process that serves to initialize and populate the JVM Pool. At initial connection time with each System Agent, the JVM Pool can be initialized with the RBA in a System Agent to allow for future control commands to be initiated.

The Resource Broker then requests the topology information. This information represents the Compute Resources that are available for allocation from this given Resource Broker Agent (RBA). Each Compute Resource represents a set of resources that are available to support services deployed in the managed Environment. This includes, but is not limited to, available Memory, available Compute Power (Power Units or MHz), available Disk, mount Points, such as software available, and licensing.

The JVM Pool can also maintain this knowledge, as the different types of System Agents offer different levels of support. Additionally, the architecture can support the ability for a single System Agent to simultaneously support multiple RBAs. Each RBA represents a given Compute Resource.

For the purpose of Topology management, the JVM Pool can internally cache all of the initial information obtained. Both the initial state of the Compute Resources as well as the ongoing utilization of those resources are maintained such that the resource brokering can always be able to make the most informed decisions.

In accordance with one embodiment, the JVM Pool accounts for any allocation or de-allocation of resources from a given Compute Resource as a result of a Resource Broker action. Additionally, since the possibility exists that Compute Resources may change both as a result of usage by the services deployed in the managed environment, and as a result of possible external impacts to the underlying pool of physical resources, a communication mechanism can be implemented to maintain up-to-date knowledge in the JVM Pool.

Given the knowledge of the topology as represented by the JVM Pool, the Resource Broker can be fully aware of the supply-side of the resource equation. The Resource Broker, therefore, is able to determine the most-appropriate Compute Resource for JVM allocation given the characteristics of the allocation request. The metadata for the Service can specify the requirements that need to be met for the deployment, including both resource requirements and potential operational requirements.

In addition to the topology management and Resource Brokering, all JVM level control operations can be initiated through the Resource Broker, as the Resource Broker is responsible for all JVM allocation decisions based upon the Resource Broker algorithms. The Resource Broker logically also serves the purpose of tracking the allocated JVMs and providing the control operations that affect the life-cycle of these JVMs.

The Resource Broker maintains the association of which JVMs are allocated by which Resource Broker Agents executing in which System Agent(s). Any and all interactions for a given JVM utilize the Resource Broker for determining where the JVM is in the managed environment. Additionally, any JVM control operations that are to be taken as a result of an action initiated, either directly by the Administrator or due to a successful Rules Engine evaluation, can be initiated via the Resource Broker.

Resource Placement Algorithms

The Resource Broker can support multiple placement algorithms for determining the appropriate Compute Resource to satisfy a deployment. In one embodiment, the environment can support running the JVM so that the JVM can efficiently execute with the available compute resources. The logical set of algorithms that the Resource Broker can provide are described below.

In one embodiment, operational placement starts from the full set of Compute Resources in the JVM Pool. The Resource Broker can assess whether or not the operational requirements specified in the Service metadata could be honored. The result is a reduction in the set of possible Compute Resources that can then be used for a subsequent resource based placement decision.

In one embodiment, a list of possible operational requirements includes software availability, license availability, virtual or non-virtual environment supported, IP requirement, HA requirements (dedicated host), and Best-fit or Worst-fit initial placement.

The most appropriate resource based allocation approaches are to utilize direct resource availability algorithms for process placement. One example is the fit approach. With this algorithm, the Resource Broker selects the Compute Resource which has the appropriate set of free resources available to match the given deployment request.

In one embodiment, there can be either best-fit or worst-fit. In the best-fit algorithm, the Resource Broker takes the list of all Compute Resources that could satisfy the resources requested and then chooses the Compute Resource that provides the smallest availability of the given resource. The benefit is that the most-efficient use of an individual Compute Resource would occur, by leaving smaller amounts of unused resource on a given Compute Resource.

Conversely, in the worst-fit algorithm, the Resource Broker takes the list of all Compute Resources that could satisfy the resources requested and then chooses the Compute Resource that provides the greatest availability of the given resource to satisfy the requirement.

In one embodiment, when considering process placement, the resource considered by the best-fit or worst-fit algorithm includes memory, since optimizing several resource dimensions at the same time introduces a great deal more complexity.

In one embodiment, the Resource Broker provides a Round-Robin or First-fit Placement algorithm which satisfied a first-fit approach. This can be accomplished by taking the set of Compute Resources that each can satisfy the resource requirements of the deployed Service and simply selecting the first Compute Resource in that returned set. In another case, the Resource Broker uses a random selection from the returned set as opposed to selecting the first in the list.

In addition, multiple placement algorithms can be supported and configuration semantics are allowed for both a global default algorithm and a per-service algorithm.

JVM Management

JVM Management is the primary interface for the other components in the System Controller to meter and control JVM instances. It includes three sub-services to obtain and equip new JVMs, meter the resources of a JVM, and control the resources of a JVM.

The main component for JVM creation is the JVM Broker that is tracking which Compute Resources are available to create new JVM instances on. A Resource Broker Agent (RBA) manages each Compute Resource. The RBA is responsible for the creation of the JVM instances. All outside communication goes through the JVM Pool, which directs the request to the corresponding RBA.

The Resource Management framework or the Resource Broker system is a general hardware abstraction layer. It can potentially be used with a large number of different machine types. If the machine type supports partitioning, the Resource Broker system can use that functionality to partition the machine as needed. Depending on exactly what a certain machine type supports, different pieces of the high-end functionality are available. At a minimum, new JVMs can be created on the machine with rough resource usage targets (limited guarantees, limited sharing, no suspension and no migration).

Traditional operating systems normally provide limited forms of resource measurement and control. Resource usage metering is often inexact. For example, one cannot know if the current CPU usage is actually spent executing application logic or if it is just the JVM that decided that there are some spare cycles available and decided to do some cleaning up work or method optimizations. Resource control is even more unfeasible. For example, a JVM can be told to run on a specific CPU (CPU pinning is supported by most operating systems), but this is a very coarse grained control mechanism; one cannot control the percentage of the CPUs compute power one can use and one cannot prevent another application from stealing CPU power. In addition, resource limitations on memory are controlled to some degree by specifying a max heap, but it does not control native memory growth and we cannot easily know how much of the heap that is used (live data) and how much of the heap that is free.

Figure 9:
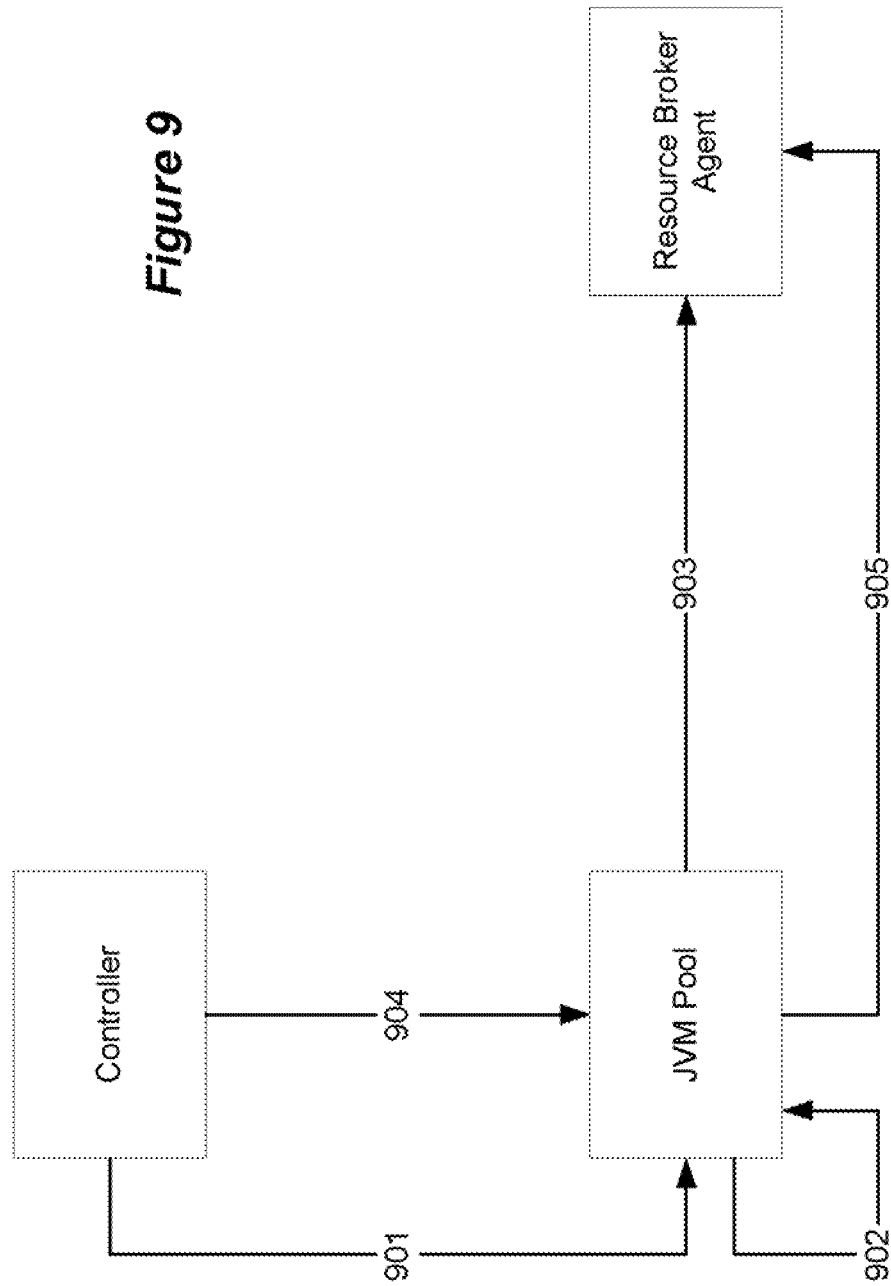
FIG. 9 is an exemplary illustration of an interactive diagram of how JVM creates and starts in accordance with one embodiment of the invention.

FIG. 9 is an exemplary illustration of an interactive diagram of how JVM creates and starts in accordance with one embodiment. JVM creation is the basic functionality of the Resource Broker. As shown in FIG. 9, at step 901, the System Controller asks the JVM Pool to create a new JVM with certain requirements. Then, at step 902, the JVM Pool finds a Resource Broker Agent that fulfills the requirements. Then, at step 903, the JVM Pool requests that the RBA should reserve room for the specified JVM. Then, at step 904, the upper layers populate the JVM with the necessary process arguments, and ask the JVM Pool to start the JVM. Finally, at step 905, the request gets passed to the RBA that, in turn, actually starts the JVM.

As shown in FIG. 9, the two-stepped approach (a creation step and a start step) allows for location-dependent configuration. After the creation stage, location dependent information such as the IP-address and where the software is installed are all known, so that the actual Compute Resource that has been selected can run the new JVM.

In some embodiments, resource metering and control are important functionality when there is abstracted away hardware. Resource metering allows the Controller to find out whether this system needs more or less resources. In addition, resource metering allows the Controller to collect resource usage information that can be used for auditing and billing in an on-demand-based environment.

In one embodiment, resource control is to create resource isolation, or to make sure that multiple different applications can run on the same box without impacting each other. Without resource isolation between applications, it is difficult to discern whether a system needs more resources. In one example, there can be four resource classes, or types of resources, that can be requested and measured: CPU, memory, network bandwidth and disk I/O.

In one example, a normalized metric called Compute Power can be used to request and measure CPU utilization. The Compute Power can be measured in normalized MHz, so that the Compute Power can be roughly comparable between different compute resources. When requesting CPU resource, the Controller can set a minimum (i.e. what must be guaranteed to be available) and a share. The share is used to give the JVM a hint on which JVM, of many on a compute resource, should be given excessive resources if they are available. In addition, only a minimum can be specified for the other resource types. Potentially, overcapacity can be provided on a first come first serve basis as guided by the shares. This design choice simplifies the placement of servers, or the optimization space, because resources can be optimized along one dimension—compute power.

Resource metering allows the Controller to decide whether an instance needs more of a special resource. First, the Controller sets a lower resource guarantee for a resource. Then, it checks how many resources are used later on. Consequently, when the Controller later finds out the resource currently used is lower than the set guarantee, the system knows it is not low on that resource. On the other hand, if the usage is above the set lower guarantee, the system is low on that resource. Resource metering can also provide information about how many resources the system has used which users could then use for auditing and billing. The resources used for this purpose are typically the most primary physical resources, i.e., Compute Power and total memory.

The user of the Resource Broker attaches a resource agreement to a JVM creation request, such as a specification of how much of some of the resource classes this JVM should have. The JVM Pool tries to find an appropriate Resource Broker Agent that controls a compute resource that has at least the specified amount of resources available. The Controller can request a change to the existing Resource Agreements in cases when the JVM needs more or less resources of different classes. In one example, a request to change a resource agreement either succeeds or fails immediately.

In some embodiments, there is a need for Specification and Provisioning of Files. The other layers or components in the System Controller do not know what software is available to the compute resource the JVM is finally placed on. A protocol/specification is needed to make sure that the upper layers can specify the files the JVM needs before it can start. The Resource Broker Agent can verify that these files are in place before starting the JVM.

In some embodiments, there is a need to manage JVM Lifecycle Events. The Resource Broker is responsible for informing the upper layers about important events related to specific JVMs. Some notifications can be given before an event occurs, such as before the JVM is about to start, or, before the JVM is about to suspend. Other notifications are given after the event occurs, such as after the JVM has started, after the JVM has resumed, or after the JVM has exited.

In one embodiment, The Resource Broker can create special VM machines. The Resource Broker can also provide extended capabilities beyond the standard capabilities for such special VM machines. The extended capabilities include: Resource Control & Isolation; Resource Limits; Virtualized File System; Suspend/Resume; and Live Migration.

In one embodiment, an application running on a compute resource can be guaranteed a certain amount of the specified resource classes so that other applications running on the same compute resource are isolated from this application and cannot affect the resources it has been guaranteed. The resource guarantees can also be resource limits. For example, an application on a virtual machine with resource control can have an implicit resource limit in that the application cannot use resources that have been guaranteed to other virtual machines on the same compute resource. In addition, some hypervisors also support setting a hard resource limit. Even though there is spare capacity the application is not allowed to use it. This can be useful for billing purpose.

Figure 10:
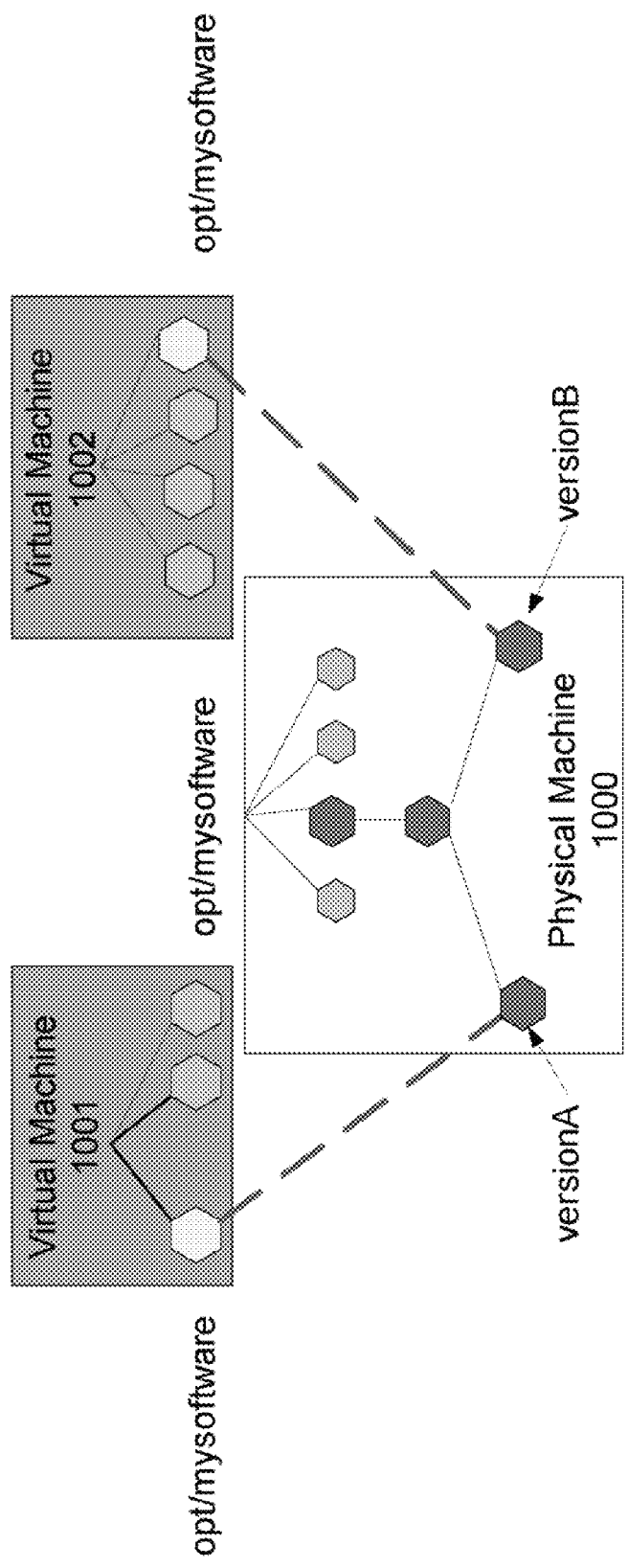
FIG. 10 is an illustration that shows a virtualized file system in accordance with one embodiment of the invention.

FIG. 10 shows a virtualized file system. In this example, multiple different JVMs 1001 and 1002 run on the same compute resource 1000, wherein the required files may be in conflict with each other. For example, an application requires version A of a software product to be installed in /opt/mysoftware/software.jar. Another application may require version B of the same software product to be installed in /opt/mysoftware/software.jar. To allow both of these to execute on the same compute resource 1000, some machine types support a virtualized file system. This virtualized file system separates the real physical location of the files from the location where the JVM expects them to be.

As also shown in FIG. 10, on the physical machine 1000, there are two directories /opt/mysoftware/versionA/software.jar and /opt/mysoftware/versionB/software.jar. Further, inside the first VM 1001, /opt/mysoftware is already mounted to the physical directory /opt/mysoftware/versionA. Also, in the second VM 1002, /opt/mysoftware is mounted to /opt/mysoftware/versionB. Consequently, without changing either of the applications, both applications can run on the same compute resource that would otherwise be impossible. To specify the mount points, a mounts file is configured for a Resource Broker Agent (RBA). This mounts file is also a way to specify the location of the software available to the agent so it is used also in the Plain Agent case where there is no hypervisor.

In one embodiment, virtual machines on top of a hypervisor can be suspended to disk and later resumed from disk. This functionality is normally handled by the hypervisor. In another embodiment, some virtual machines can be migrated from one physical box to another physical box, while they are still running on top of a hypervisor. Memory and all states, including the IP-address, migrate along with the instance. The data transfer is typically done in the background while the application continues to run on the original virtual machine. The application is only paused for a short period of time in the end while the most critical final pieces of data are moved.

In some embodiments, a JVM Group manages a number of JVMs that serve one application. One can specify which IP-addresses are available for a JVM Group and provide a certain level of fault tolerance by specifying the minimum number of machines that the group should run on. The minimum number of machines in this case is the number of physical hosts. For example, if this number is 2, when running in a Virtual Infrastructure, it indicates that an application with two JVMs can run on two different hosts.

Resource Monitoring

The Resource Monitoring component of the System Controller is responsible for establishing and maintaining communication with the defined set of Observers in the System Agents. In addition, the Resource Monitoring component can identify the set of metrics that must be collected in order to satisfy the currently executing Rules and the Resource Monitoring component can identify the set of metrics that must be collected to satisfy the requirements of the System Console. In addition, the Resource Monitoring component can initiate the scheduled collection of the required metrics from the correct Observers in the System Agent(s) and receive real-time alerting information from Observers in the System Agent(s) for activities such as detecting process failure. Furthermore, the Resource Monitoring component can inform the Rules Engine of newly arrived metrics and alerts from Observers in the System Agent(s); inform the Rules Engine of newly arrived metrics from Observers in the System Controller; and, maintain the correlation between the defined metrics and the appropriate Observer in the System Agent(s).

The Resource Monitor can provide time sensitive information both to the System Console and the System Controller Rules Engine. It is also responsible for informing each Observer in the virtualized environment what information it is expecting to receive as well as how often it expects to receive it.

It is the responsibility of the Observer to obtain this information at the defined time interval and make it available to the Resource Monitor. As some activity in the System environment is more time-sensitive than others, it is important to allow for this time critical information to be made available to the Resource Monitor, and, thus, the Rules Engine, as close to when the actual activity occurred as possible.

In one embodiment, the interaction model supports both timer-based and real-time monitoring by allowing the Observer to push information to the Resource Monitor for all data that is needed by the Rules Engine. This allows the Resource Monitor, after informing the Observers of their monitoring requirements, to simply wait for new observed values to be presented and to inform the Rules Engine that modified metrics have arrived. This allows for immediate actions to be initiated by the Execution Engine to address the potentially critical outage or have the System Controller immediately alert the operations staff.

The Resource Monitor communicates with one or more Observers in dispersed System Agents or even within the System Controller. This communication largely depends upon the information required by the Rules Engine, as defined by the configured Rules.

In one embodiment, the Resource Monitor can obtain various forms of monitoring and metric information from various information sources.

One source is through a Resource Broker Agent (RBA) Observer. The RBA Observer can return real-time alert information relative to process failure; return time-based power-unit, memory consumption, network i/o, information when managing a virtualized environment; and, return OS or machine level metrics.

Another source is a Managed Server Observer. The Managed Server Observer can return real-time alert information on server-state transition or other detected critical outage; return sampled per-server resource or service metrics; and, also return aggregated machine-wide application-server metrics.

Another source is an Admin Server Observer. The Admin Server Observer can return a real-time alert information on audited configuration change action; return aggregated per-server metrics where Admin Server serves as an observer for all servers in the domain; and, return aggregated domain-wide metrics for all servers in the domain.

Another source is a Web Server plug-in agent. The Web Server plug-in agent can return real-time alert information on server-state transition or other detected critical outage; return time-based per-server resource or service metrics.

The Resource Monitor capabilities discussed above focus on the handling of metric and alert information. The Resource Monitor can support the collection of various data types that are being collected by remote Observers. Such information can be made available to the Resource Monitor via the existing Observer contract, regardless of the source or type of information.

Compute Resource Management

The JVMPool keeps track of the compute resources (physical machines or resource pools) that are available to the Resource Broker to start instances on. Moreover, it can help upper layers locate which compute resource a JVM actually is running on, and the state of each compute resource under control.

The initial handshake between Controller and System agent is initiated from the Controller. It connects to a known System agent (whose location is given by the Controller prior to some configuration step) and exchanges version information. The JVM Pool then adds the corresponding Resource Broker Agent to its list of agents.

The JVM Pool registers a new Resource Broker Agent (RBA), when it is added to the JVM Pool. During the registration the RBA tells the JVM Pool what resources it is managing. This information can be cached on the JVM Pool side. The RBA keeps track of the JVMs that it is controlling and how many resources are currently reserved for these JVMs.

When a new JVM is created, the JVM Pool assigns an IP address to the JVM. Each RBA owns a list of IP addresses. When the agent is registered with the JVM Pool in the Controller, it gives the list of IP addresses to an IP Address Manager. When the JVM Pool attempts to create a JVM, the IP Address Manager first checks if there are any addresses given in the JVM Group that the JVM is required to use. If none of the JVM Group addresses are available in the IP Address Manager, then the JVM creation fails. It is also possible not to set any addresses at all in the JVM Group to allow the IP Address Manager to give the new JVM an arbitrary address from its list of unused addresses.

For a Plain Agent, the owned IP addresses include only a local host if the machine is single homed, or an IP address for each network adapter in the multi-homed case. For a virtualized environment, the user can reserve unused IP addresses for System use. These addresses also need to be given to the System agent in the agent configuration.

Cross-Machine Communication

Web Services are used as the communication layer between the JVM Pool and the Resource Broker Agent (RBA). On both sides, each of the web services deployed has a local implementation, a web service implementation and a remote client. The Web Service implementation delegates calls to the local implementation. The remote client implementation uses the appropriate URL, creates a web service proxy and invokes operations on the proxy object when its methods are called. All these are implemented using a delegation pattern that hide the implementation and give flexibility to change them without affecting callers of web services.

In one embodiment, during the communication, the Web Services and their callers use Java Beans. All these Java Beans have appropriate JAXB mappings in their classes in the form of annotations, which map to the appropriate XMLBeans.

The Resource Broker Agent (RBA) deploys a web service, JVMAgentService for agent specific operations. The RBA invokes these methods and provides an API for creating JVMs on the Agent; controlling JVMs on the Agent such as starting, destroying, suspending and resuming JVMs; getting the resource usage and availability per JVM or per Agent basis; getting the capabilities and extended capabilities of the requested Agent; registering the Callback object so that a listener can be notified for JVMStateListener calls; and, changing the agreement on the interested JVM running on the Agent.

In one embodiment, the JVM Pool deploys a JVMPoolService and a JVMStateListener.

JVMPoolService is a WebService deployed on the JVM Pool for pool-specific operations. The Resource Broker Agents invoke these methods. This WebService is an extension to JVMAgentService. It provides an API for registering/deregistering Agents with the Resource Broker; creating and managing JVM Groups; getting the ComputeResource for a given JVM; and, getting all JVMs created on the Resource Broker Agent.

JVMStateListener is a callback WebService deployed on the Resource Broker Agent for operating remote callbacks for JVM state changes. The Resource Broker Agents invoke these methods through a callback mechanism. These callback objects are registered using the registerEventCallback( ) method on the JVMPoolService. The registerEventCallback( ) goes to the specific Agent which creates a remote handle to the JVMStateListener (a remote client for JVMStateListener). Upon the state changes on the JVMs created on this Agent, it makes the respective callbacks on the registered remote handle. These remote handles make WebService requests to the JVMStateListener deployed on the Resource Broker Agent. This WebService is just a communication layer for the JVMListener. It provides the API to Callback before JVM starts; Callback after JVM has started; Callback before suspending JVM; Callback after resuming JVM; and, Callback when JVM exits.

The communication layer between the JVM Pool and the Resource Broker Agent (RBA) uses Java Beans. These Java Beans contain the appropriate JAXB mappings as annotations in the class for mapping the beans to the appropriate XMLBeans. All these beans extend from RBBean. RBBean is a marker interface to indicate that the Java Bean being used is Resource Broker communication related.

Resource Management in a Non-Virtualized Environment

In a traditional or non-Virtualized Environment, the Node Manager manages a set of application servers. Server instances are often distributed across multiple domains, machines, and geographic locations. The Node Manager is an Application Server utility that can start, shut down, and restart Administration Server and Managed Server instances from a remote location. In one example, the Node Manager process controls server instances in any Server domain, as long as the server instances reside on the same machine as the Node Manager process. The Node Manager runs on each computer that hosts Application Server instances.

In one embodiment, the Node Manager supports System Recovery. The Node Manager recovers servers by bringing them up again when the system crashes. In addition, the Node Manager keeps track of the successful start of a server by keeping a lock file. It creates a lock file when the server is about to start and removes the file after the server is successfully shutdown. If the Node Manager crashes and a lock file exists, the Node Manager will automatically start those servers once rebooted.

The Node Manager can also support Automatic Server Restart. The Node Manager provides the ability of automatically restarting the server if the server fails to come up. This can be done by configuring a retry number in the Node Manager Configuration.

The Node Manager also has supporting functionality for Automatic Server Migration. The Cluster Master uses this functionality to do Automatic Server Migration. It uses the Node Manager client to talk to the Node Manager and calls the start server with a passing IP Address in the properties, along with other necessary information, so that the Node Manager server can migrate the IP Address from the old machine to the new machine before it starts the server.

The Node Manager has supporting functionality for Automatic Service Migration. Singleton Services use this functionality to do automatic service migration. The Node Manager allows executing custom scripts in order fulfill this feature. Singleton Services can deactivate the service on the existing server when it finds that a particular service loses its lease.

The Node Manager also supports executing a script for starting and stopping the servers wherein a user can configure the server-specific properties of the Node Manager by enabling start and stop scripts. One can also modify those scripts to add an application-specific environment.

The Node Manager can also support State Monitoring and State Maintenance. The Node Manager keeps a monitor for every server it starts. This monitor maintains the state by loading the state file periodically. The state file can be updated by the server every time the state of it changes. The administration console calls into Node Manager to obtain the state and shows it to the user.

In one embodiment, Node Manager has three main components: the Node Manager Server, Node Manager Client and Node Manager Configuration.

The Node Manager Server, for example, in the case of a WebLogic Server (or WLS Server), can be used to listen for messages from the Node Manager client such as CMD_START, CMD_KILL, CMD_STATE, etc., and act accordingly by starting/killing or getting the state of the WLS server process. It monitors the WLS server process and updates the STATE in the state info file on a regular basis. The Node Manager Server can support two protocols, plain and SSL, and only the Node Manager Client can talk to it.

The Node Manager Client is a convenient way of reaching to the Node Manager Server to request for specific operations. It provides standard java API for all the operations supported by Node Manager Server. The Node Manager Configuration helps configuring the Node Manager Server and domains followed by their servers running on the respected machine.

The Integrated Resource Management

A virtualized environment and a non-virtualized environment can be integrated to take advantage of both functionalities. Both the Node Manager, in a non-virtual environment, and the Resource Broker Agent, in a virtual environment, can run as a single process and receive control calls from both the Node Manager Client in a non-virtual environment and the Control System Client (Resource Broker) in a virtual environment.

In one embodiment, the integrated resource management system provides integrated Control Management. The integrated resource management system maintains JVMs in the JVM Pool. Clients can get hold of the JVMBroker from the JVMPoolService to create and start JVMs. JVMs are pooled by the Resource Broker. The Resource Broker Agent (RBA) can make use of Virtual Environments (such as Xen, VMWare, ESX Server) facilities. Using these facilities, the user can suspend the JVMs, take an image of JVMs, and resume them again using the image.

In one embodiment, the integrated resource management system can manage the resources efficiently. JVMs, in the JVMPool provide usage information such as "application power units", "memory in use", "network bandwidth", "disk usage", etc. A user can define resource agreements by specifying how the resource agreements are to be used on the JVM machine and can also change the agreements dynamically. In addition, based on the Resource Agreement, the integrated resource management system provides monitoring information on resources so that users can dynamically allocate resources for efficient usage of resources.

In one example, the Node Manager can be plugged into the Resource Broker Agent and serve together as single process. The integration concentrates on allowing pluggable operations on both sides in order to serve combined functionalities. In addition, a command line can be used to start the integrated Resource Broker Agent. The integrated installer also provides a script to start the integrated Resource Broker Agent.

In one embodiment, the integrated environment can get the control operations (start/kill of application server processes) in two different ways: Calls initiated from Node Manager Client and Calls initiated from Control System Client or the Resource Broker.

Figure 11:
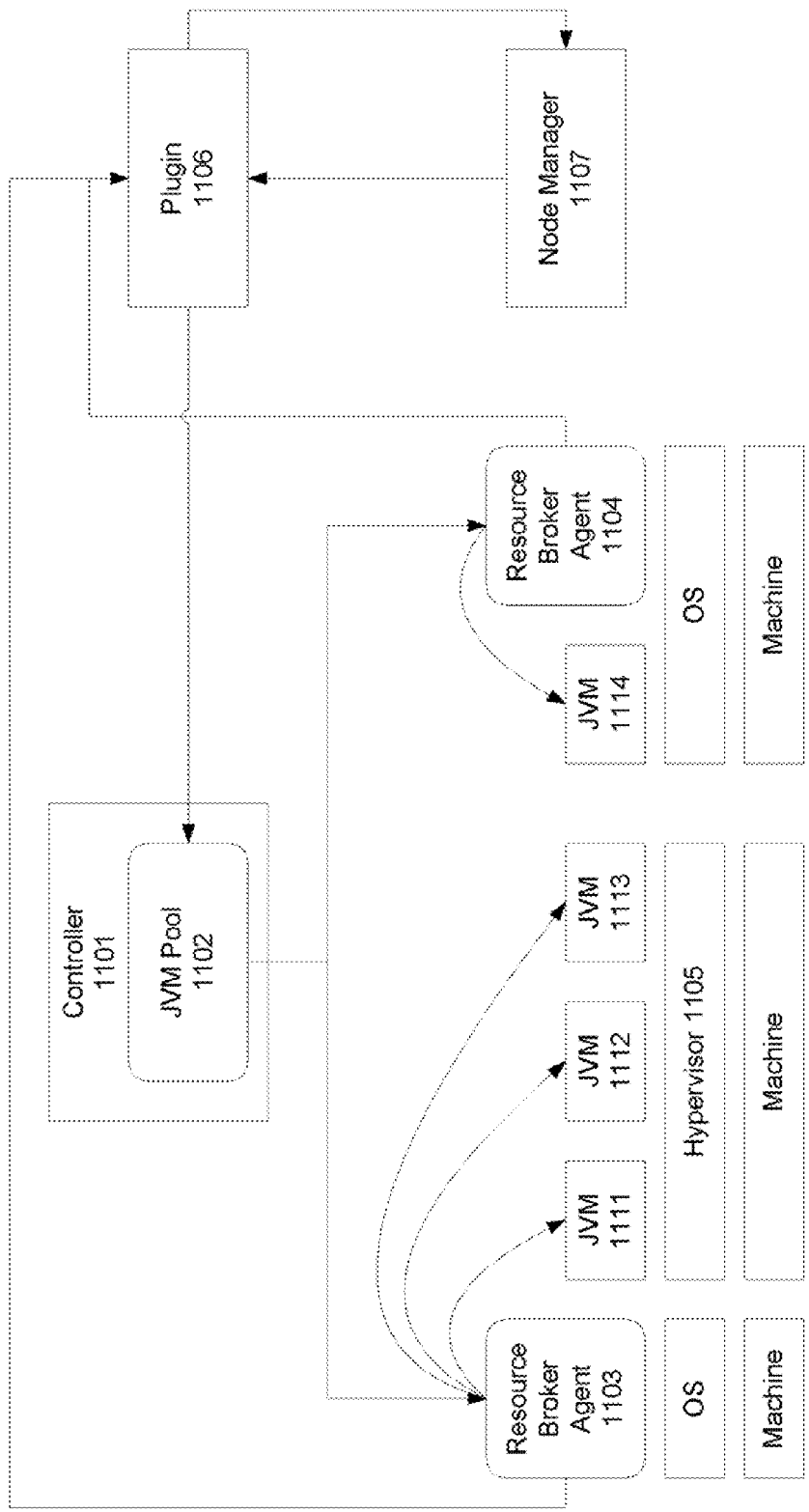
FIG. 11 is an illustration that shows the components involved in the integration from both the virtualized environment and the non-virtualized environment.

FIG. 11 shows the components involved in the integration from both the virtualized environment and the non-virtualized environment.

In the example as shown in FIG. 11, components from Node Manager 1107 in a non-virtual environment include: NodeManagerSystem, NodeManagerSystem.Plugin, DefaultNodeManagerPlugin, WLSProcess, and WLSProcess.ExecutableCallbackHook.

The NodeManagerSystem is a singleton implementation provided by the Node Manager to plugin other systems for basic function such as a creating process or creating IP Bind/Unbind Callback Hooks. The Node Manager uses this singleton instance to initiate the NodeManagerSystem with a given plugin or the Default plugin implementation. In addition, the Node Manager provides a NodeManagerSystemPlugin, which is a facility for plugging in a different implementation for creating a WLSProcess instance or creating IP Bind/Unbind callback hooks.

The Node Manager can start, monitor and stop/kill the WLS server processes using WLSProcess. The WLSProcess encapsulates the process related information such as which command to start, which environment to use, etc. The WLSProcess provides control operations on the process instance. The WLSProcess also keeps a list of hooks that implement an ExecutableCallbackHook interface. This ExecutableCallbackHook interface can execute the hook before starting the process and after stopping the process, while the WLSProcess performs these callback executions.

As an example, components from the Resource Broker Agent 1103 and 1104 in a virtual environment includes: AgentPlugin, JVMListener, JVMBrokerListener, and JVM.

AgentPlugin is a convenient way provided by Resource Broker Agent (RBA) to embed another system. JVMListener is a convenient way for listening to JVM events. JVMBrokerListener is an interface for listening to JVM creation events. The JVMBroker can notify these listeners when a JVM is created. The JVM is an object that encapsulates the JVM process-related information and provides operations for the JVM process, such as starting, destroying, suspending, resuming, or usage.

In addition, a NodeManagerRBAPlugin 1106 interfaces between the Node Manager and the Resource Broker Agent. The NodeManagerRBAPlugin class is a combined plugin from both sides. It implements an AgentPlugin from the ResourceBrokerAgent side and the NodeManagerSystem.Plugin from the NodeManager side. It also implements some of the Resource Broker listeners such as the JVMBrokerListener and the JVMListener to listen for these events to make the Node Manager calls to initialize and start monitoring the newly created JVM initiated from Control System.

Figure 12:
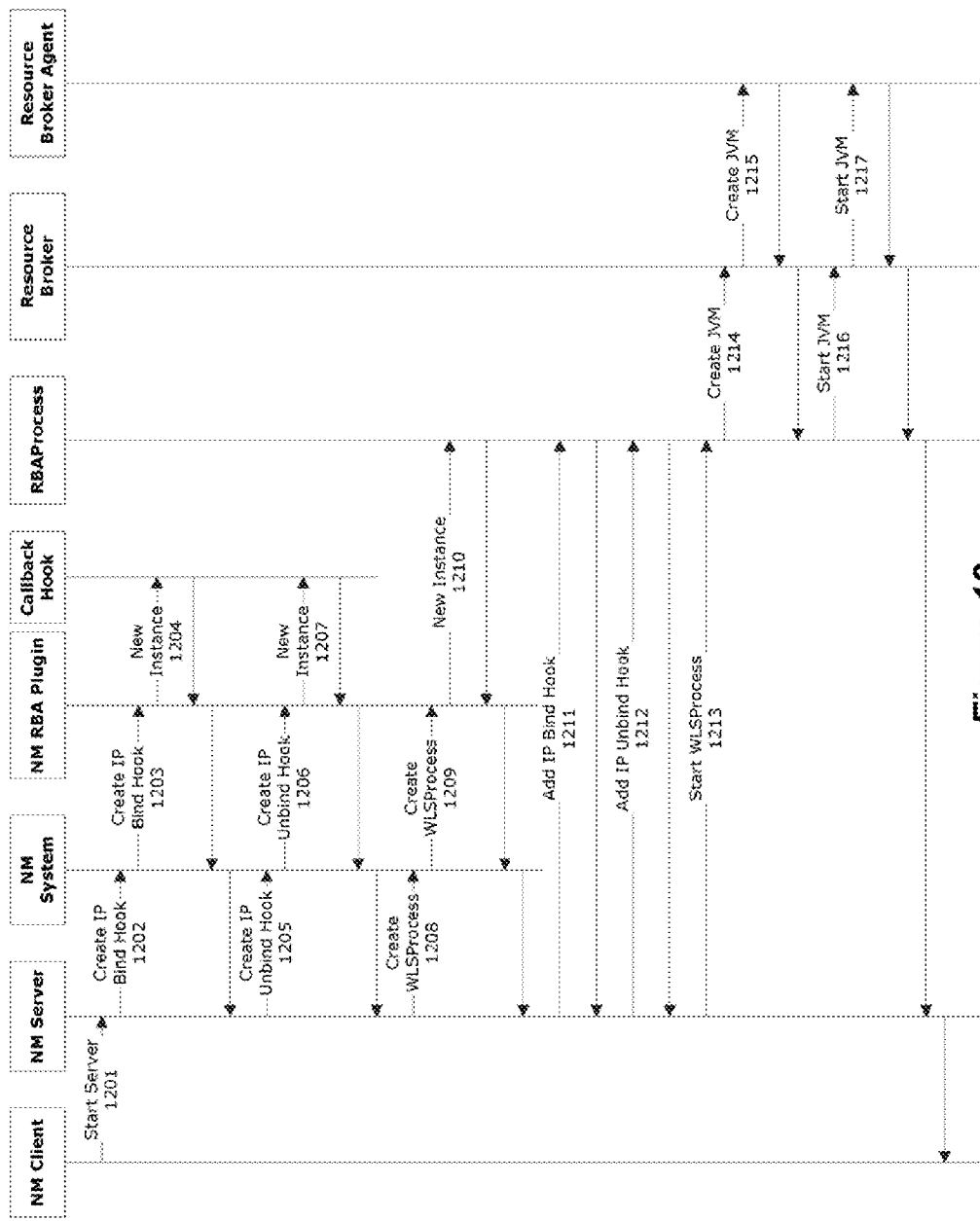
FIG. 12 is an illustration that shows a Node Manager Client initiated control call flow.

FIG. 12 is a diagram that illustrates the Node Manager Client initiated control call flow. As shown in FIG. 12, the NodeManagerRBAPlugin allows the Node Manager to monitor an operation of the RBA after receiving notification of the operation from the RBA. At step 1201, a Node Manager client starts a Node Manager Server; at step 1202, the Node Manager Server calls a NodeManagerSystem to create an IP Bind Hook; at step 1203, the NodeManagerSystem calls the NodeManagerRBAPlugin to create a new instance of the callback hook, which is returned to the Node Manager Server; at steps 1205, 1206, and 1207, an IP Unbind Hook is similarly created and returned to the Node Manager Server; at steps 1208, 1209 and 1210, the Node Manager Server manages to ask the NodeManagerRBAPlugin to create a new instance of RBAProcess; at steps 1211 and 1212, both the IP Bind Hook and IP UnbindHook are added to the newly created RBAPRocess; and, finally, at steps 1214, 1215, 1216 and 1217, the NodeManagerRBAPlugin creates and starts a JVM through the Resource Broker and a Resource Broker Agent (RBA).

Figure 13:
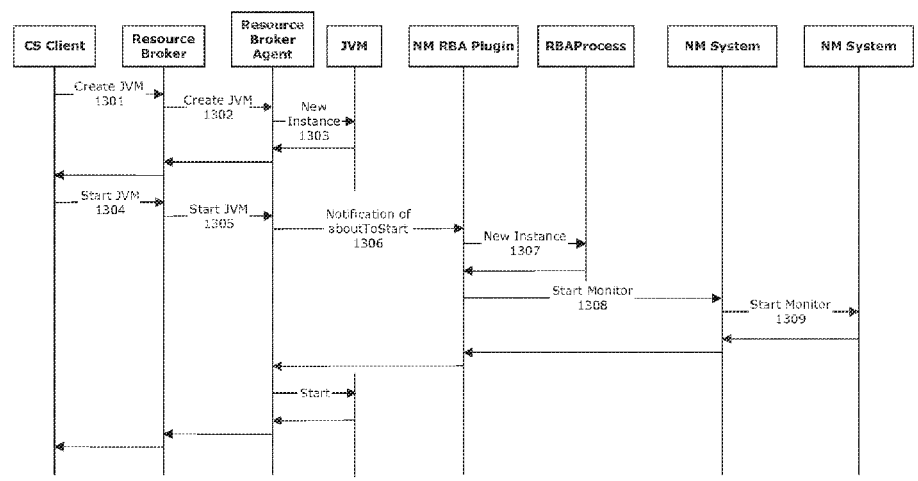
FIG. 13 is an illustration that shows a Control System initiated call flow.

FIG. 13 is a diagram illustrating a Control System initiated call flow. As shown FIG. 13, the NodeManagerRBAPlugin directs an operation of the resource broker agent upon receiving a request from the Node Manager. At step 1301, a Control System client starts a Resource Broker; at steps 1302 and 1303, the Resource Broker calls a Resource Broker Agent (RBA) to create an JVM; at steps 1304 and 1305, the Resource starts a JVM; at step 1306, the Resource Broker Agent (RBA) notifies the NodeManagerRBAPlugin that the process is about to start; at step 1307, the NodeManagerRBAPlugin create a new instance of RBAProcess; and, at steps 1308 and 1309, the NodeManagerRBAPlugin starts the monitoring functionality on a Node Manager System.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for deploying and managing software services, comprising:
   a computing environment that includes a plurality of virtualized and non-virtualized platforms;
   a plurality of resource pools that provide access to physical computing resources of the computing environment and pre-installed software for hosting a software service;
   a plurality of resource broker agents, wherein each resource broker agent is configured to
      access one or more resource pools of the plurality of resource pools, and
      start and manage virtual machines on the one or more resource pools; and
   a system controller that communicates with the plurality of resource broker agents to collect resource data from the plurality of resource broker agents, the resource data including
      resource pools accessible to the plurality of resource broker agents,
      physical computing resources and pre-installed software provided by each of the accessible resource pools,
      availability of the physical computing resources, and initial and ongoing utilization of the physical computing resources;
   wherein, in response to a request to deploy and manage a software service, the system controller determines one or more virtual machines required by the software service based on a set of policies,
   wherein the set of policies is at least partially defined by one or more service level agreements associated with the requested software service and software services already deployed to the computing environment;
   wherein the system controller is configured to communicate with the plurality of resource broker agents to dynamically allocate, based on the collected resource data and the set of policies, the one or more virtual machines to one or more resource pools to which the one or more virtual machines are to be deployed, via one or more of the plurality of resource broker agents, for hosting and managing the software service; and
   wherein the system controller communicates with the plurality of resource broker agents to dynamically reconfigure deployment of the software service at runtime, via one or more of the plurality of resource broker agents, based on the collected resource data related to the ongoing utilization of the physical computing resources and the set of policies.

2. The system according to claim 1, wherein each said resource broker agent communicates with the system controller using web services.

3. The system according to claim 1, wherein the system controller monitors current resource usage of a running virtual machine on a said virtualized or non-virtualized platform.

4. The system according to claim 3, wherein the resource broker agents are utilized to broker allocation requests between the system controller and the resource pools based upon constraints and requirements associated with the software service to be deployed.

5. The system according to claim 3, wherein the system controller supports a plurality of placement algorithms to determine an allocation of the resource pool to satisfy a deployment of the software service, wherein the placement algorithms include one or more of
   a best-fit placement algorithm,
   a worst-fit placement algorithm,
   a first-fit placement algorithm, and
   a random-select placement algorithm,
   wherein the random-select placement algorithm is applied to a set of resource pools satisfying minimum requirements of the software service.

6. The system according to claim 3,
   wherein the resource broker agent performs resource metering;
   wherein information associated with the resource metering is used by the system controller for one or more of:
      allocating the resource pool, and
      auditing and billing in an on-demand-based environment.

7. The system according to claim 3, wherein the system controller supports a plurality of functionalities that include
   resource control and isolation;
   resource limits;
   virtual file system;
   suspend and resume virtual machines; and
   live migration of virtual machines.

8. The system according to claim 1, wherein the system controller supports at least one of an explicitly configured system agent discovery and a dynamic system agent discovery.

9. The system according to claim 1, wherein the set of policies is at least partially defined by one or more service level agreements associated with the requested software service and software services already deployed to the computing environment that define quality of service metrics including
a number of servers required to be made available in a domain,
a maximum load supportable by the servers, and
response time required for the software service.

10. A method for deploying and managing software services operating on one or more micro-processors, comprising the steps of:
providing a computing environment that includes a plurality of virtualized and non-virtualized platforms,
wherein the computing environment comprises a plurality of resource pools that provide access to physical computing resources of the computing environment and pre-installed software for hosting a software service;
a plurality of resource broker agents, wherein each resource broker agent is configured to
access one or more resource pools of the plurality of resource pools, and
start and manage virtual machines on the one or more resource pools; and
providing a system controller that communicates with the plurality of resource broker agents to collect resource data from the plurality of resource broker agents, the resource data including
resource pools accessible to the plurality of resource broker agents,
physical computing resources and pre-installed software available to provided by each of the accessible resource pools,
availability of the physical computing resources, and
initial and ongoing utilization of the physical computing resources;
wherein, in response to a request to deploy and manage a software service, the system controller determines one or more virtual machines required by the software service based on a set of policies,
wherein the set of policies is at least partially defined by one or more service level agreements associated with the requested software service and software services already deployed to the computing environment;
wherein the system controller is configured to communicate with the plurality of resource broker agents to dynamically allocate, based on the collected resource data and the set of policies, the one or more virtual machines to one or more resource pools to which the one or more virtual machines are to be deployed, via one or more of the plurality of resource broker agents, for hosting and managing the software service; and
wherein the system controller communicates with the plurality of resource broker agents to dynamically reconfigure deployment of the software service at runtime, via one or more of the plurality of resource broker agents, based on the collected resource data related to the ongoing utilization of the physical computing resources and the set of policies.

11. The method according to claim 10, further comprising:
providing a communication layer configured to
direct an operation of the resource broker agent on the one or more virtual machines upon receiving a request from a node manager to perform the operation, wherein the node manager operates to manage a set of application servers in a non-virtualized platform; and
allow the node manager to monitor the operation after receiving a notification of the operation from the resource broker agent.

12. The method according to claim 10, wherein the resource broker agents as an interface for the system controller to monitor current resource usage of a running virtual machine on a said virtualized or non-virtualized platform.

13. The method according to claim 12, wherein each resource broker agent communicates with the system controller using web services.

14. The method according to claim 12, wherein the resource broker agents are utilized to broker allocation requests between the system controller and the resource pools based upon constraints and requirements associated with the software service to be deployed.

15. The method according to claim 12, wherein the system controller supports a plurality of placement algorithms to determine an allocation of the resource pool to satisfy a deployment of the software service, wherein the placement algorithms include one or more of
a best-fit placement algorithm,
a worst-fit placement algorithm,
a first-fit placement algorithm, and
a random-select placement algorithm,
wherein the random-select placement algorithm is applied to a set of resource pools satisfying minimum requirements of the software service.

16. The method according to claim 12, wherein the system controller supports a resource agreement, where the system controller and the resource broker agents implement a same set of standard interfaces.

17. The method according to claim 12, wherein the system controller supports a plurality of functionalities that include resource control and isolation;
resource limits;
virtual file system;
suspend and resume virtual machines; and
live migration of virtual machines.

18. The method according to claim 10, wherein the system controller supports at least one of an explicitly configured system agent discovery; and a dynamic system agent discovery.

19. The method according to claim 10, wherein the set of policies is at least partially defined by one or more service level agreements associated with the requested software service and software services already deployed to the computing environment that define quality of service metrics including
a number of servers required to be made available in a domain,
a maximum load supportable by the servers, and
response time required for the software service.

20. A non-transitory computer readable storage medium, including instructions stored thereon which when read and executed by one or more computers cause the one or more computers to perform the steps comprising:
providing a computing environment that includes a plurality of virtualized and non-virtualized platforms,
wherein the computing environment comprises a plurality of resource pools that provide access to physical computing resources of the computing environment and pre-installed software for hosting a software service;
a plurality of resource broker agents, wherein each resource broker agent is configured to access one or more resource pools of the plurality of resource pools, and start and manage virtual machines on the one or more resource pools; and providing a system controller that communicates with the plurality of resource broker agents to collect resource data from the plurality of resource broker agents, the resource data including resource pools accessible to the plurality of resource broker agents, physical computing resources and pre-installed software provided by each of the accessible resource pools, availability of the physical computing resources, and initial and ongoing utilization of the physical computing resources;

wherein, in response to a request to deploy and manage a software service, the system controller determines one or more virtual machines required by the software service based on a set of policies, wherein the set of policies is at least partially defined by one or more service level agreements associated with the requested software service and software services already deployed to the computing environment;

wherein the system controller is configured to communicate with the plurality of resource broker agents to dynamically allocate, based on the collected resource data and the set of policies, the one or more virtual machines to one or more resource pools to which the one or more virtual machines are to be deployed, via one or more of the plurality of resource broker agents, for hosting and managing the software service;

wherein the system controller communicates with the plurality of resource broker agents to dynamically reconfigure deployment of the software service at runtime, via one or more of the plurality of resource broker agents, based on the collected resource data related to the ongoing utilization of the physical computing resources and the set of policies;

directing an operation of the resource broker agent upon receiving a request from a node manager; and allowing the node manager to monitor the operation after receiving a notification of the operation from the resource broker agent.

\* \* \* \* \*

UNITED STATES PATENT AND TRADEMARK OFFICE
CERTIFICATE OF CORRECTION

PATENT NO. : 9,542,222 B2
APPLICATION NO. : 12/618527
DATED : January 10, 2017
INVENTOR(S) : Mousseau et al.

It is certified that error appears in the above-identified patent and that said Letters Patent is hereby corrected as shown below:

On the Title Page

Column 1, under item (73) Assignee, Line 2, delete "Redwood Shore, CA" and insert
-- Redwood Shores, CA --, therefor.

In the Claims

In Column 27, Line 34, in Claim 10, before "provided" delete "available to".

Signed and Sealed this
First Day of August, 2017

Joseph Matal
*Performing the Functions and Duties of the*
*Under Secretary of Commerce for Intellectual Property and*
*Director of the United States Patent and Trademark Office*